United States Patent
O'Brien et al.

(10) Patent No.: US 10,878,501 B2
(45) Date of Patent: Dec. 29, 2020

(54) ORDER DEPTH VIEW VISUALIZATION TOOL

(71) Applicant: Nasdaq Technology AB, Stockholm (SE)

(72) Inventors: Michael O'Brien, London (GB); Alan Jukes, Sydney (AU); Saker Asllan, London (GB)

(73) Assignee: Nasdaq Technology AB, Stockholm (SE)

(*) Notice: Subject to any disclaimer, the term of this patent is extended or adjusted under 35 U.S.C. 154(b) by 312 days.

(21) Appl. No.: 15/913,165

(22) Filed: Mar. 6, 2018

(65) Prior Publication Data

US 2018/0260896 A1 Sep. 13, 2018

Related U.S. Application Data

(60) Provisional application No. 62/468,048, filed on Mar. 7, 2017.

(51) Int. Cl.
*G06Q 40/00* (2012.01)
*G06Q 40/04* (2012.01)
*H04L 29/06* (2006.01)

(52) U.S. Cl.
CPC ............ *G06Q 40/04* (2013.01); *G06Q 40/00* (2013.01); *H04L 63/1483* (2013.01)

(58) Field of Classification Search
CPC .............................. G06Q 40/00; G06Q 40/04
See application file for complete search history.

(56) References Cited

U.S. PATENT DOCUMENTS

| 6,321,212 B1* | 11/2001 | Lange ................. G06Q 40/00 705/35 |
| 7,110,974 B1* | 9/2006 | Rust .................. G06Q 40/025 705/37 |
| 8,266,045 B2* | 9/2012 | Waelbroeck .......... G06Q 40/00 705/35 |
| 8,494,946 B2* | 7/2013 | Lortscher, Jr. ......... G06Q 40/00 705/36 R |

OTHER PUBLICATIONS

Wu-chang Luo, Spread Arbitrage between Stock Index Futures in Taiwan: A Cointegration Approach, Nov. 14, 2002, University of Southampton, web, 1-41 (Year: 2002).*

* cited by examiner

*Primary Examiner* — I Jung Liu
(74) *Attorney, Agent, or Firm* — Nixon & Vanderhye, P.C.

(57) ABSTRACT

An example computer system is configured to access broker order data and executed trade information in a memory, and to correlate the executed trade information and broker order data. The computer system is further configured to generate a view arranged to simultaneously display order spread, trade price for executed trades, and order book depth over a time period, based upon the correlated data. The broker order data represent orders transmitted by an external computer to an electronic exchange to trade in a tradeable instrument. The executed trade information includes information on trades executed by the electronic exchange based on the said orders.

20 Claims, 17 Drawing Sheets

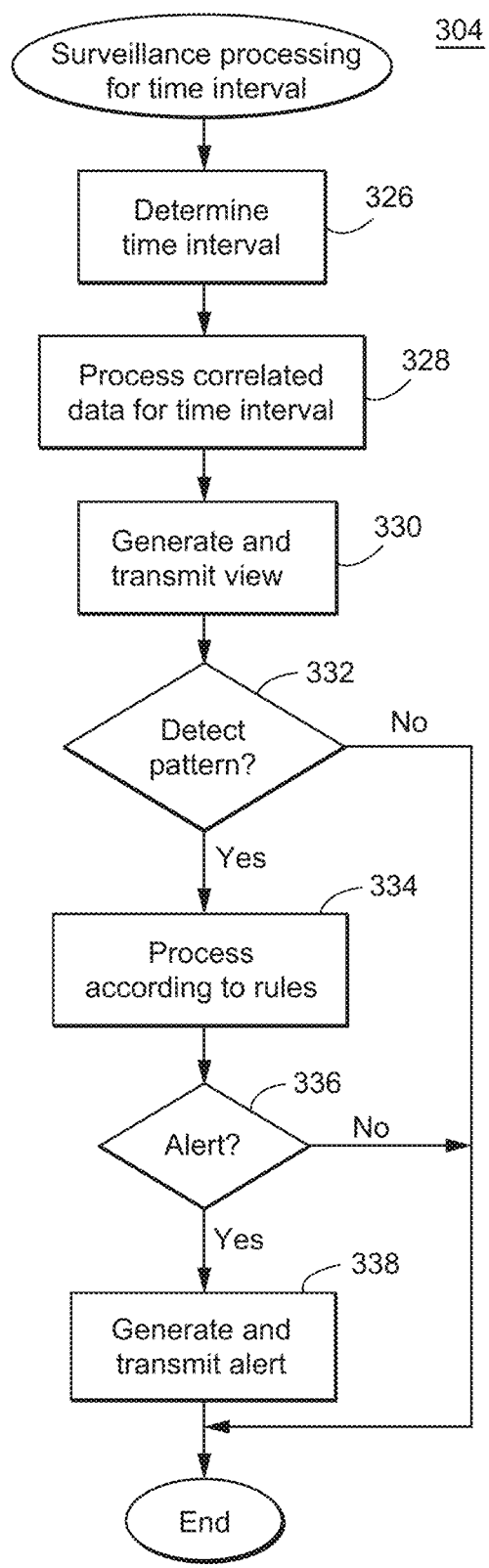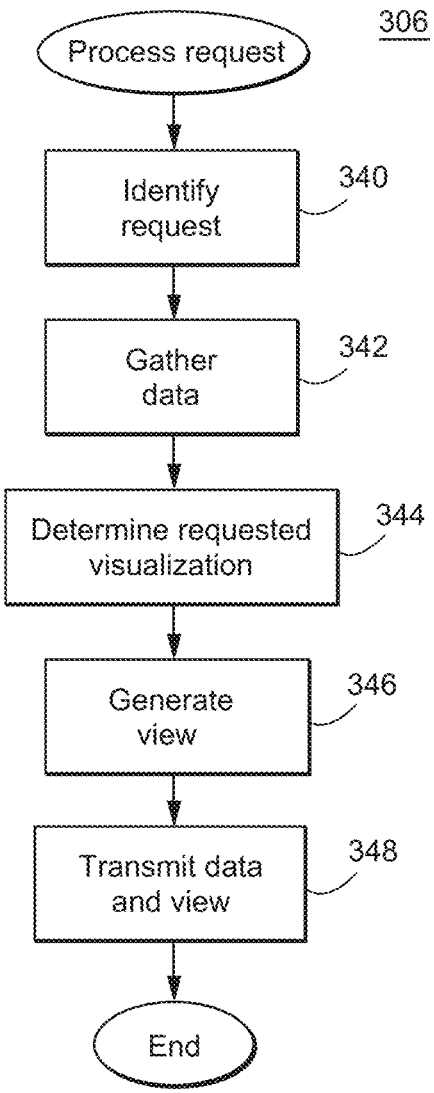
FIG. 3B
FIG. 3C

ORDER DEPTH VIEW VISUALIZATION TOOL

CROSS-REFERENCE TO RELATED APPLICATIONS

This application claims priority to U.S. Provisional Patent Application No. 62/468,048, filed on Mar. 7, 2017, which is herein incorporated by reference in its entirety.

TECHNICAL OVERVIEW

The technology described herein relates to displaying patterns in incoming data and actions caused by the incoming data in distributed computing systems with high volume and high frequency message flows, such as electronic exchange systems. More particularly, the technology described herein relates to techniques for detecting abnormalities caused by incoming transaction requests in such systems.

INTRODUCTION

Electronic exchange systems allow brokers, traders and other entities to engage in the exchanging of various instruments, such as, for example, stocks and other securities instruments. Once a transaction is initiated by a broker, trader or other entity, the entire series of processes including the matching of buyers and sellers, and the completion of the transaction happens entirely electronically. Sometimes, even the initiation of the transactions may be performed by computers operating according to certain preprogrammed trading algorithms and without a human operator controlling each transaction. The computer systems and communication networks that implement these electronic exchange systems enable large numbers (e.g., several hundred thousands to millions) of trades to execute during a trading day. Many of these trades are completed almost instantaneously (e.g., a fraction of a second) upon a buy or sell order being input to the exchange system and/or the input bid or offer prices matching the market price. The large volumes and high frequency of trades enabled by sophisticated electronic exchange systems, and the processing of orders from numerous entities, make the reliable and timely identifying of market manipulation very challenging. However, just as technology has enabled electronic exchanges to vastly improve the reliability, efficiency and availability of trading in tradeable instruments, the same technology has introduced problems that are unique to electronic exchange systems. Spoofing, for example, is one such problem that has the potential, if left undetected, to destroy the reliability of an electronic exchange.

Spoofing and layering ("spoofing" for short) is a market manipulation technique in which a manipulator first enters one or more orders (bids or offers) on to one side of the electronic order book at prices and volumes that can have an effect on the market to move the prices in a direction desired by the manipulator, yet sufficiently distant from the market price point in order not to complete the trade. In effect, by adding the orders to one side of the electronic order book, the manipulator creates an impression to other market participants that the market is moving in a particular direction. The manipulator then typically submits a relatively large order to the opposite side of the order book in order to have the transaction executed and profit by the market movement and price variation that he caused.

Electronic exchange systems implement electronic alerting systems which automatically monitor and/or analyze, in real-time and/or in non-real-time, the electronic order message transmitted to the electronic exchanges by brokers and execution of trades in electronic exchanges, and generate alerts when certain defined behavior patterns are detected in the orders and/or trades. One of the key challenges facing compliance analysts is dealing with complex alert scenarios and being able to make informed decisions regarding the escalation or closure of alerts. In the case of spoofing attempts and the like, although alerts and the like can be generated based on the detection of certain characteristics, the analyst needs as much information as possible with which to make reliable decisions.

At present, analysts pore over rows upon rows of order data and trade data to spot unusual patterns and to confirm spoofing and other like abnormal patterns. Some other conventional techniques provide tools for market replay, and the like, to recreate each of a series of orders. These techniques are extremely time consuming and unreliable. It is desired that this time consuming, unreliable and error-prone techniques are improved upon. Accordingly, it will be appreciated that new and improved techniques, systems, and processes are continually sought after.

SUMMARY

According to some example embodiments, a computer system comprises at least one memory and at least one processor configured to access broker order data and executed trade information in the memory, and to correlate the executed trade information and broker order data. The processor is further configured to generate a view arranged to simultaneously display order spread, trade price for executed trades, and order book depth over a time period, based upon the correlated data. The broker order data represent orders transmitted by an external computer to an electronic exchange to trade in a tradeable instrument. The executed trade information includes information on trades executed by the electronic exchange based on the said orders.

The view may comprise a first graph representing the order spread and the trade price for executed trades and a second graph representing the order book depth. The first graph may further comprise trade volume for at least one of the executed trades. The first graph may include time on an x-axis and price or value on a y-axis, and the second graph may include time on an x-axis and volume on a y-axis. The first and second graphs may be aligned on respective x-axes.

The second graph may further comprise a graph representing a cumulative volume of said orders and a graph representing order book depth. The graph representing order book depth may be derived from orders within a predetermined distance from a market price and excludes orders further than the predetermined distance from the market price. Representing order book depth may be done by varying color, intensity of color or pattern, in accordance with the order book depth.

The second graph may further comprise a graph representing volume of orders of at least one selected entity. The second graph may further comprise a graph representing a net volume of said at least one selected entity. The first graph may further comprise a graph representing volume of executed trades of said at least one selected entity. The graph representing a net volume of the at least one selected entity and the graph representing volume of executed trades of the at least one selected entity are displayed in response to selection of the selected entity. The selection of the selected entity may be automatically performed based upon a received alert message.

The content of the view may be automatically changed in accordance with one or more received alert messages. Additionally, the at least one processor may be further configured to detect a predetermined pattern in the correlated data and to generate at least one of said alert messages in response to the detecting.

According to some example embodiments, a method comprises operations to access broker order data and executed trade information in the at least one memory, and to correlate the executed trade information and broker order data. The method also includes operations to generate a view arranged to simultaneously display order spread, trade price for executed trades, and order book depth over a time period, based upon the correlated data. The broker order data represent orders transmitted by an external computer to an electronic exchange to trade in a tradeable instrument. The executed trade information includes information on trades executed by the electronic exchange based on the said orders.

According to another embodiment, a non-transitory tangible storage medium includes stored instructions which, when executed by a processor of a computer, causes the computer to perform operations comprising accessing broker order data and executed trade information in at least one memory, correlate the executed trade information and broker order data, and generate a view arranged to simultaneously display order spread, trade price for executed trades, and order book depth over a time period, based upon the correlated data. The broker order data represent orders transmitted by an external computer to an electronic exchange to trade in a tradeable instrument. The executed trade information includes information on trades executed by the electronic exchange based on the said orders.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 3A, 3B and 3C illustrate flowcharts representing processing performed by a surveillance processing system, according to some example embodiments.

DETAILED DESCRIPTION

Figure 1:
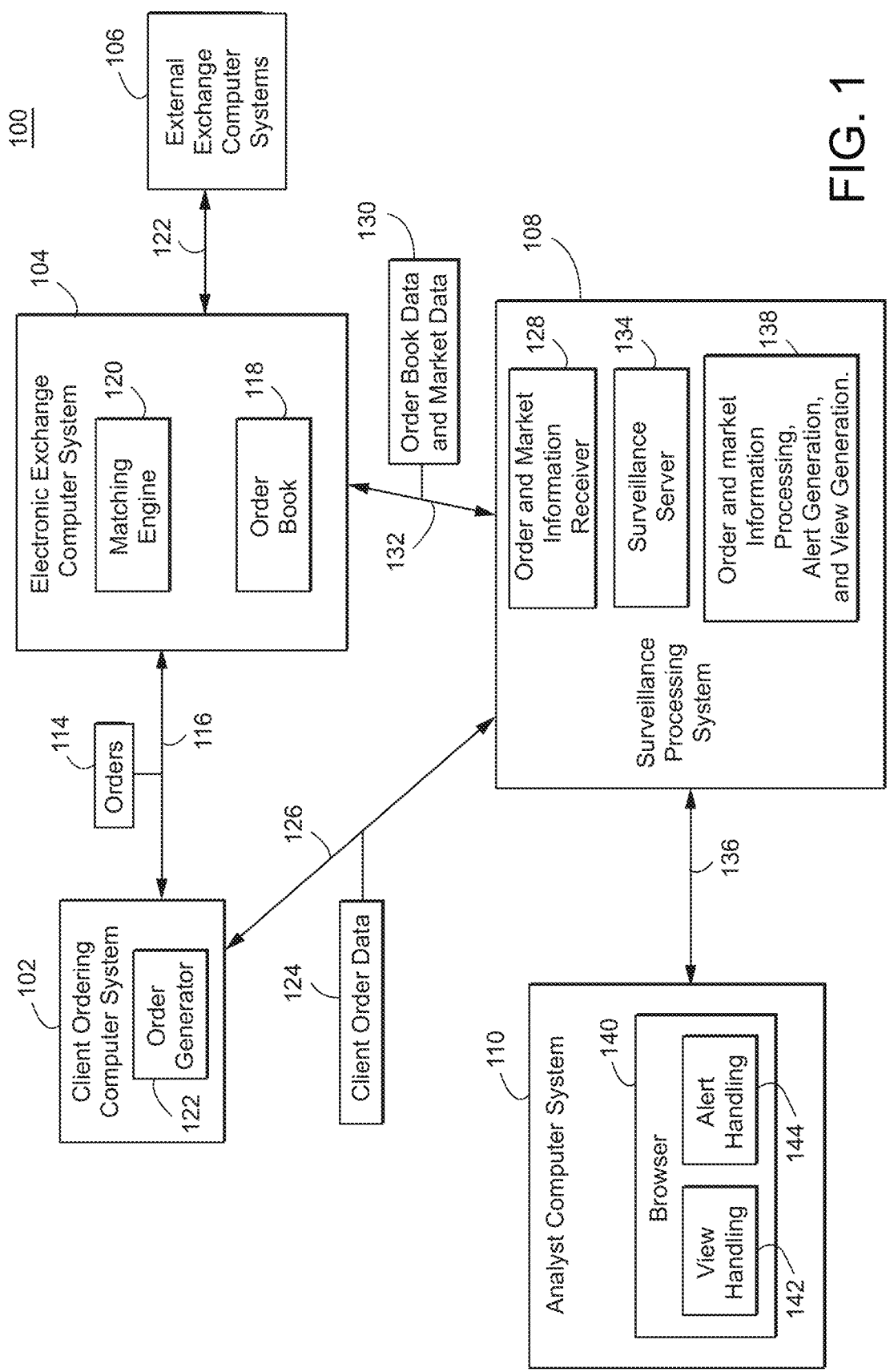
FIG. 1 illustrates an electronic exchange system environment, according to some example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Example embodiments provide an order depth visualization tool that provides visualizations to enable a user, such as an analyst, to 'see' patterns of behavior used in market manipulations such as, for example, spoofing and layering techniques that manifests as order book imbalance, with trading direction contrary to the weight of orders at the time. A spoofer (i.e., trader engaging in spoofing) may start by inputting to an electronic trading system large bids whilst selling, or large offers whilst buying. By enabling an analyst to reliably and efficiently identify a signature pattern of a manipulative technique such as spoofing, and to identify the behavior in outliers, the speed and accuracy with which the analyst determines if the alert requires taking preventive action and/or the necessity of further investigation/escalation are improved.

The way spoofing works is to give other market participants the (false) impression that 'something' is about to happen, where that 'something' could be heavy buying or heavy selling. A spoofer creates this impression by entering large flows of orders to one side of the order book of an electronic exchange. This influx of orders may persuade other market participants to trade, in the belief that the volume will continue into the order book, and move the price in a direction from which they can then profit. The spoofer, of course, seeks to transact against these other participants. Therefore, the spoofer then removes the conditions that led the other participants to trade. In doing so, the spoofer places the other participants in a potentially losing situation. The spoofer further capitalizes on this by creating the reverse effect to his previous action: where the spoofer was previously heavily bid, he would revert to be heavily offered and vice versa. This further compounds the situation for the other participants, who will often seek to exit their positions to the nearest available level at a loss, which also happens to be the spoofer's small opposing order, thereby generating a profit for the spoofer. This cycle can repeat as often as is successful for the spoofer.

The detection of spoofing type of anomaly requires insight into the exchange system's order book. Plotting the order book in a suitable manner with information necessary for detecting spoofing's signature pattern etc., is challenging when compared to plotting trade data which may involve fewer parameters (e.g., trade price, volume and time). With respect to the order book, in order to identify imbalance, many more parameters (e.g., an order's time, price, volume, aggregated volume, relationship to the rest of the market, execution of corresponding trades on both sides of the market, and proximity to best bid and offer etc.) are used.

Figure 5:
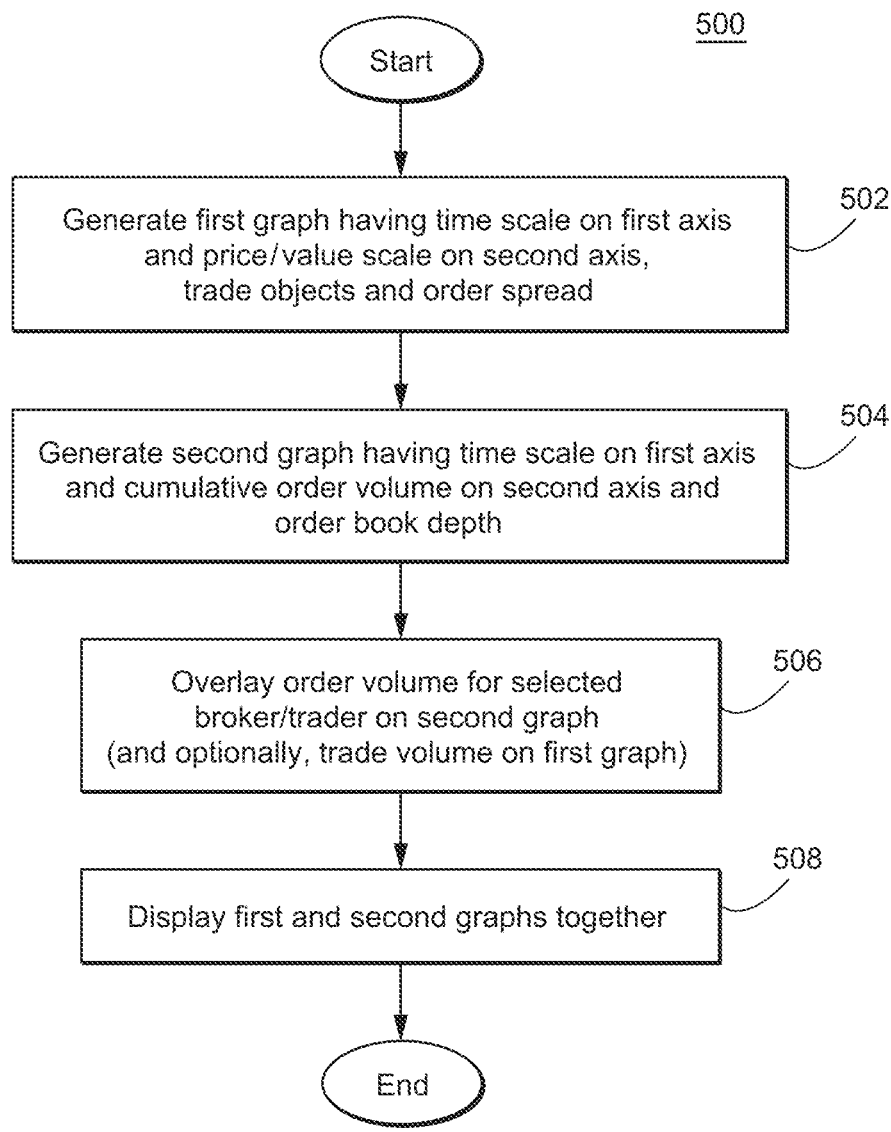
FIG. 5 illustrates a flowchart representing a process performed by an analyst computer system or surveillance processing system when generating a view, according to some example embodiments.
Figure 6:
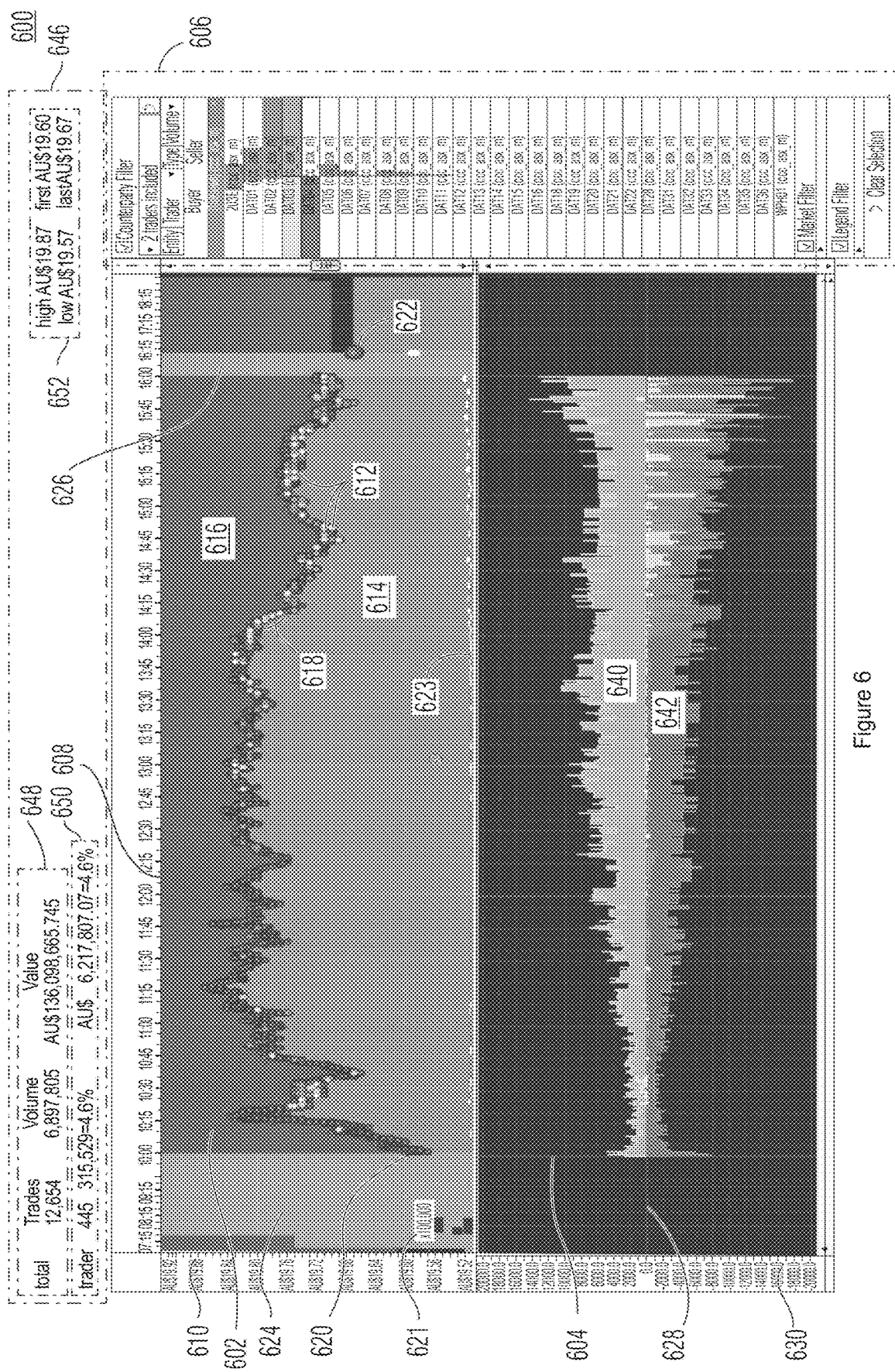
FIGS. 6-15 illustrate example views from an order depth visualization tool, according to some example embodiments.

FIG. 1 illustrates a system environment including an electronic exchange surveillance server that provides an order depth visualization tool, according to some example embodiments. The surveillance server which provides for the order depth visualization tool according to some example embodiments is described in relation to FIG. 2. Certain example processing actions performed by the surveillance server are described in relation to FIG. 3, and example processing performed on the analyst's computer system are described in relation to FIG. 4. FIG. 5 illustrates a flowchart describing the generation of an order depth view according to some example embodiments. An example view provided by an order depth visualization tool according to some example embodiments is shown in FIG. 6. FIGS. 7-15 show other example views that may be generated by the order depth view visualization tool. FIG. 16 illustrates a computer system which may be used in certain embodiments.

Description of FIG. 1

FIG. 1 illustrates an electronic exchange system environment 100, according to some example embodiments. Electronic exchange system environment 100 includes one or more client ordering computer systems 102, an electronic trading computer system 104, external exchange computer systems 106, a surveillance processing computer system 108, and one or more analyst computer systems 110 that are each communicatively connected to one or more others of computer systems 102-110 by one or more communication networks. In some embodiments, each of, or some groups of, the computer systems 102-110 may be physically located in geographically distributed locations and interconnected via the Internet.

A client ordering computer system 102 may include one or more computers operated by an entity such as, for example, a broker, that enables entities such as individuals and corporations to trade various tradeable instruments. A tradeable instrument may be, for example, a financial instrument such as a stock, bond, option, or other security etc. An order generator module 112 on client ordering computer system 102 enables its clients (e.g., corporations, individuals, etc. referred to as "traders") to input information for the trading of one or more financial instruments. The order generator module 112 then operates to generate corresponding orders 114 and to transmit the generated orders to the electronic trading computer system 104 over network connection 116. Of course, the client ordering computer system 102, although sometimes referred to herein as a "broker" or "broker computer system" too, is not limited to a broker computer system, and may represent a computer system controlled by any entity that submits orders to the electronic trading computer system 104.

An order 114 is an electronic record representing an instruction to trade a particular quantity of a tradeable instrument. An order 114 may have respective data fields for one or more of the following: client ID, instrumentID, transaction type ID, order attribute, quantity value, minimum size of order and price. The clientID identifies the broker and/or trader, the instrumentID identifies the tradeable instrument (e.g., a particular stock, a particular bond etc.), the transaction type ID identifies whether it is a bid (e.g., buy order) or offer (e.g., sell order), and the order attribute may specify flags such as, for example, whether it is a day order etc. In various embodiments, an order 114 may comprise all the above noted data fields, and/or may include one of more other fields. In addition to bids and offers, orders 114 may also include other instruction messages such as, for example, instructions to amend an already submitted order or to delete an already submitted order.

The electronic trading computer system 104 operates to receive orders 114 from client ordering computer system 102 and other such systems, and to provide a platform where orders from various sources is electronically recorded, and matched against each other in order to execute trades. The electronic trading computer system 104 may, in some embodiments, be the computer systems of a stock exchange such as, for example, New York Stock Exchange or London Stock Exchange. Trade confirmation and trade failure messages may be transmitted from the electronic trading computer system 104 to the client ordering computer systems 102 over network connections 116.

Orders 114 received at the electronic trading computer system 104 are entered into an electronic order book 118. The electronic order book 118 is a data structure that keeps track of received orders and their progress. Buy orders from the received orders are entered into the buy side of the order book, and the sell orders are entered into the sell side of the electronic order book. The order book may also be updated in accordance with received order amend or order delete messages.

A matching engine 120 operates to match each buy order in the electronic order book 118 with one or more sell orders recorded in the electronic order book 118. Various known techniques can be used in finding optimal matches.

External exchange computer systems 106 may be notified of executed trades (e.g., corresponding bid and offer order information) by the electronic trading computer system 104 over network connection 122. External exchange computer systems 106 may operate to perform post-processing for the trades, such as, for example, settlement etc.

Surveillance processing system 108 operates to provide surveillance of orders and/or trades in the electronic trading computer system 104 for signs of market manipulation or abuse. The surveillance processing system 108 may be part of, or separate from, the electronic trading computer system 104. According to some example embodiments, the surveillance processing system 108 is hosted as a cloud-based software as a service. The surveillance processing system 108 may include an order information receiver 128, a surveillance server 134 and an order information processing, alert generation and view generation module 138.

The order and market information receiver 128 operates to receive client order data (also "broker order data") 124 from the client ordering computer system 102 over network connection 126, and to receive order book and market trade data 130 from electronic trading computer system 104 over network connection 132. In some embodiments, the client order data 124 too may be received from the electronic trading computer system 104. According to example embodiments, the data 124 and/or 130 may be received in any of many forms such as real-time, on demand from the surveillance processing system 108, FTP files, etc.

The surveillance server 134 operates to control the processing on the surveillance processing system 108 and to service requests received from analyst computer systems 110. The communication between surveillance processing system 108 and analyst computer system 110 may be over a network connection 136.

The order and market information processing, alert generation and view generation module 138 operates to perform processing associated with surveillance based on order data and market trade data received by order and market information receiver 128. The module 138 may also provide for alert generation and view generation based upon the order data, order book data, market trade data and requests from analyst computer system 110. The order depth visualization tool and the views such as those shown in FIGS. 6-15 may be provided by module 138 alone or in coordination with a client component on a client such as analyst computer system 110.

The analyst computer system 110 communicates with the surveillance processing system 108 over network connection 136. In some embodiments, the analyst computer system 108 may also be part of the broker computer system, but embodiments are not limited to such placement of the analyst computer system 108. The analyst computer system 110 may include a browser 140 within which a view handling module 142 may execute to display views based upon order data and an alert handling module 144 which executes to receive alerts from the surveillance processing system 108. Example alerts include alerts regarding suspected spoofing and layering behaviors such as described above. The view handling module 142 and alert handling module 144 may be, for example, Java-based clients operating in the browser 140 and accessing the surveillance server 134.

In many places in this document, including but not limited to in the above description of FIG. 1, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 16.

Figure 2:
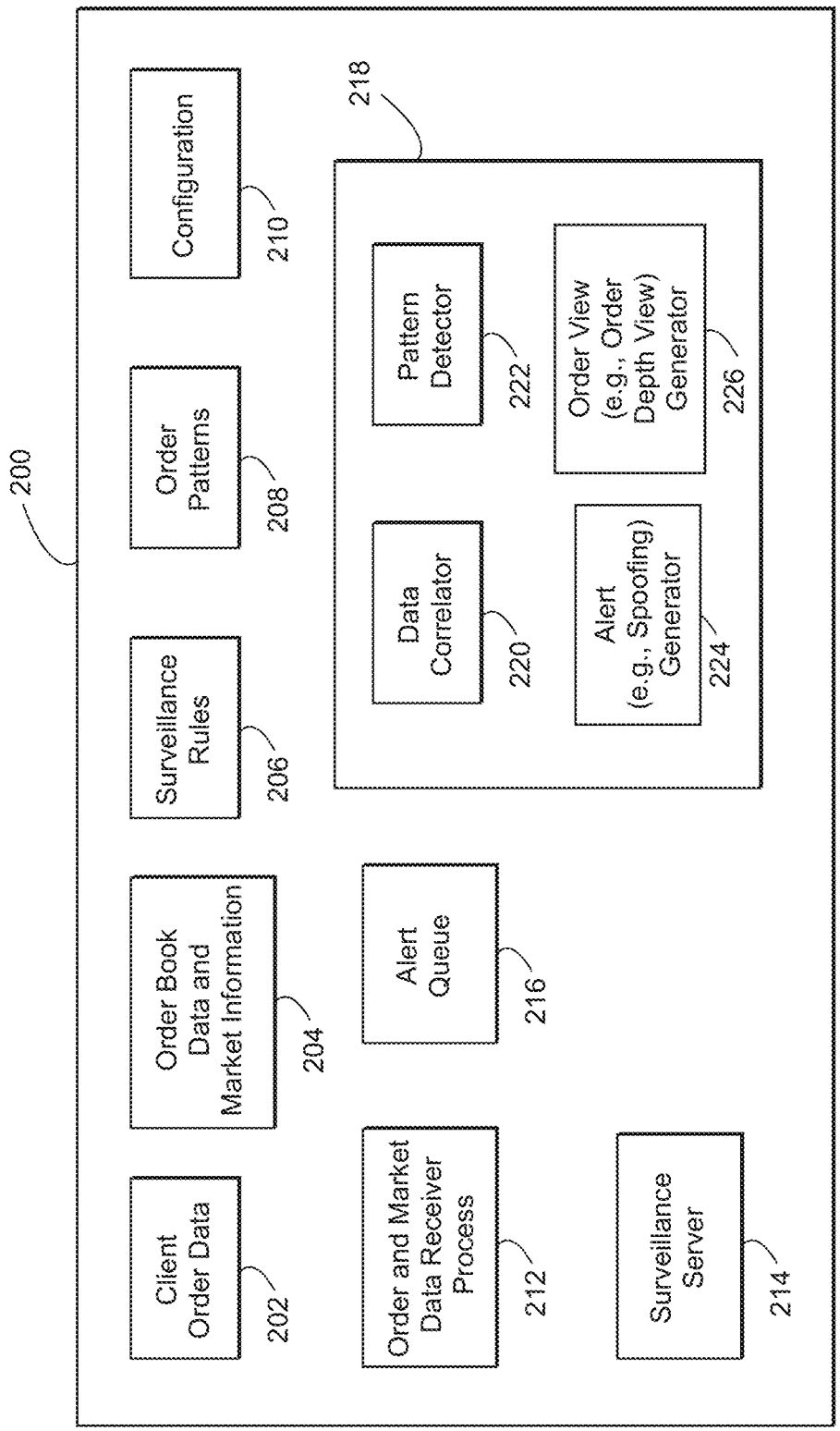
FIG. 2 is a block diagram representing data collections and processing modules of a surveillance processing system according to some exemplary embodiments.

Description of FIG. 2

FIG. 2 is a block diagram illustrating data collections and processing modules of a surveillance processing system 200 according to some exemplary embodiments. The surveillance processing system 200 may, at least in some embodiments, correspond to the surveillance processing system 108 shown in FIG. 1.

The surveillance processing system 200 includes stored client order data 202 that is based on client order data (e.g., client order data 124) received from a client ordering computer system (e.g., client ordering computer system 102), stored order book data and market data 204 based on order book data and market data (e.g., order book data and market data 130) received from an electronic trading computer system (e.g., electronic trading computer system 104), surveillance rules 206 representing predetermined programmatically-defined rules that may be applied to the order and market data during surveillance processing, order patterns 208 representing predetermined programmatically defined patterns which are desired to be detected in the order data during surveillance processing, and configuration parameters 210. Data collections 202-210 each may be stored in a respective database, a plurality of databases or in the same database.

An order and market data receiver process 212 may operate to receive and store client order data, order book data and market data (e.g., store in data stores 202 and 204). The order data, order book data and market data may be received in any format. Some embodiments may use a format such as a JSON format. The received order data, order book data and market data may pertain to one or more selected tradeable instruments (e.g., IBM stock). The order data received from the client ordering computer system 102 would then include orders for IBM stock made by traders through client ordering computer system 102, and the order book data received from electronic trading computer system 104 would include IBM stock bids and offers by all brokers (including the broker controlling the client ordering computer system 102) in the form entered into the order book. The received order data and order book data may or may not have information regarding tradeable instruments other than the selected tradeable instruments. The received order data and the received order book data may or may not be identical to the corresponding data in the client ordering computer system and the electronic trading computer system. For example, the order book data received by the server processing system 108 may have already been pre-processed by a third party service (not shown in FIG. 1). Pre-processing, by a third party or other system may include, for example, filtering the order book records according to some predetermined criteria (e.g., order time, bid/offer price or size/value, etc.), and adding or revising of fields or field values (e.g., grouping together orders by two or brokers, changing identities of the brokers or traders as recorded in the order data or order book data etc.).

A surveillance server process 214 may operate to control the processing on surveillance processing system 200 and to service requests received from various analyst computer systems such as analyst computer system 110.

An alert queue 216 is a data structure to keep track of alerts that are generated during the processing of order data, order book data and market data. For example, as further described below in relation to the flowcharts in FIGS. 3-5, the queue may be configured to keep alerts generated during the processing of order data for a predetermined time. Keeping alerts in a queue enables, for example, to quickly notify any analysts who are newly accessing the server processing system with respect to certain securities and/or clients with respect to detected potential manipulations. Example alerts include alerts notifying of potential spoofing and/or layering attempts. According to an embodiment, an alert may include some or all of the following: time of detection, a time sequence of suspicious trades, relevant trades and volumes, relevant order book information, trade and/or broker initiating the trade etc.

The surveillance processing module 218 operates to perform tasks related to surveillance of trading activity, and interaction with analyst computer systems. Surveillance processing module 218 includes a data correlator module 220, a pattern detector module 222, an alert generator module 224, and an order view generator 226.

The data correlator module 220 correlates the order data received from client ordering computer system with the order book data and market data. The order book data includes order data for all market participants and is, in many cases, anonymized when received. The correlator 220 operates to match one or more fields of each order record received from order data to a corresponding record from the order book data and/or market data. In some embodiments, the correlator calculates a signature based upon two or more of the values time of order, price, and volume for each order record in the received order data, and then proceeds to match the signature to signatures determined for records from the order book data.

The pattern detector module 222 operates to detect one or more predetermined patterns in the order data. Each of the predetermined patterns may comprise two or more trades, and may involve conditions based on any of an identifier for one or more trade instruments, price of trade, size of trade, value of trade, difference in trade versus current market (e.g., difference in price, size, or value of trade when compared to market or group of tradeable instruments), time interval between trades, and the like. For example, an example spoofing pattern may be defined as a series of at least n successive bids for a number of units not exceeding u1 of stock x at price at or near p1, followed within time interval t by an ask for at least a number of units u2 of stock x at price p2, by the same trader, where n, u1, u2, t, p1 and p2 may be configuration parameters. In some embodiments, one or more of the parameters n, u1, u2, t, p1 and p2 may be may be specified in the pattern detection rules as an offset from a value to be determined based on current market activity. For example, the pattern detection rules (e.g., rules 206 described above) may specify offsets from the current market price associated with p1 and/or p2 such that the effective values for p1 and p2 can be calculated dynamically based on the current market price or the average market price over a specified time interval. In a similar manner, u1 and/or u2 may also be determined dynamically in relation to current market activity based on corresponding offset values specified in the rules. The sequence length n and/or time interval t may also be determined dynamically in relation to current market activity (e.g., frequency of trades, etc.) based on values specified in the rules. During a surveillance session, the pattern detector module 222 may implement one or more state machines, in memory and/or hardware circuitry, during the processing of the time sequenced order data, with each state machine tracking how closely the sequence of transactions in the data being processed corresponds to a respective predetermined pattern of trades.

The alert generator module 224 operates, in conjunction with the pattern detector module 222, to generate and transmit alerts to analysts when a monitored for behavior is detected. For example, when the pattern detector module 222 determines that a predetermined pattern corresponding to spoofing exists in the analyzed data, it may cause the alert generator 224 to generate a corresponding error. In an embodiment, when signaled by the pattern detector module 222 as to the detection of a spoofing pattern, the alert generator accesses the order data to obtain the necessary data elements to populate an alert message, and transmits the alert message to one or more analysts' surveillance sessions and/or to the alert queue 216.

The order view generator 226 generates an order depth view (e.g., views shown in FIGS. 6-15) which provides an analyst with the ability to view market information useful for determining whether a spoofing attempt or other market manipulation attempt has occurred. As described elsewhere in this document, the order depth view capability vastly improves the speed, accuracy and efficiency with which analysts can detect and respond to suspected market manipulation. The order depth view capability, moreover, enables analysts even with little or no experience make determinations regarding suspected manipulation actions with less false positives than that possible with conventional techniques. The order depth view generator 226 provides for this improved surveillance capability by simultaneously illustrating the order spread and the order depth in a manner that allows for the visualization of the correlation of individual market transactions in both the market spread and the market depth.

The order depth view generator 226 may be considered as having a server component and a client component. In some embodiments, the server component generates all of, or substantially all of the views, and provides the generated views to the client component operating in a browser to be rendered. In some other embodiments, the server component gathers the data and performs further processing, and provides the processed data together with the code to generate the view to the client component which then performs the rendering of the view, using the data and the code received from the server component, in the browser. According to some example embodiments, a Java-based thin client framework is utilized for interaction in order depth view generator 226.

Description of FIG. 3

Figure 3A:
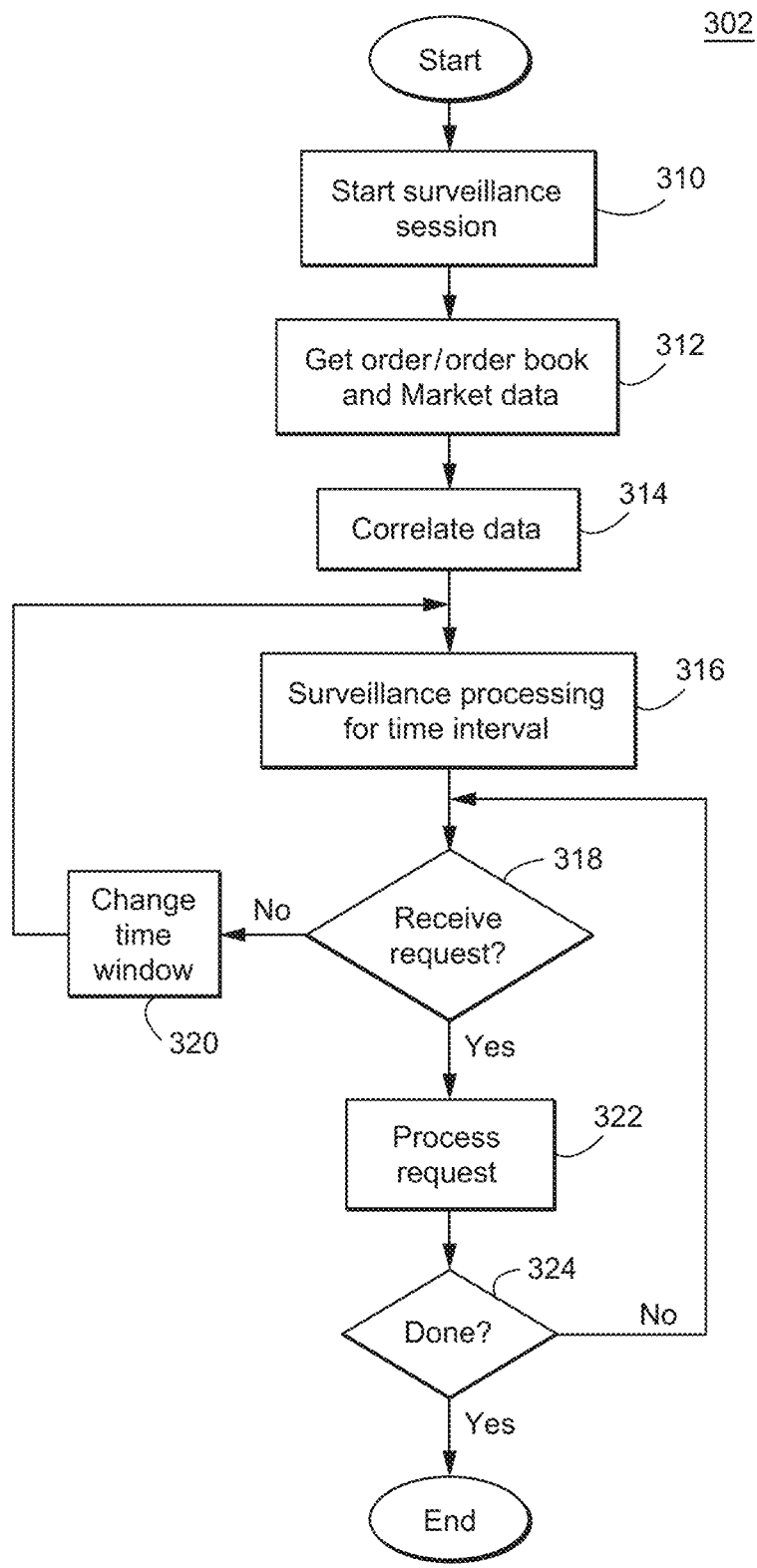

FIGS. 3A, 3B and 3C (collectively FIG. 3) illustrate flowcharts representing processing performed by a surveillance processing system, according to some example embodiments.

FIG. 3A shows a flowchart of a process 302 performed by a surveillance processing system such as, for example, surveillance processing system 108 shown in FIG. 1.

After entering into process 302, a surveillance session is started at operation 310. The surveillance session may be started upon a request from an analyst using a computer system such as analyst computer system 110. The analyst may specify at least one broker, at least one security tradeable instrument, and/or a time interval for which surveillance is desired.

At operation 312, order data, order book data and market data are obtained. Accessing of the data may be different depending on a mode of operation. When not operating in real-time, or when operating offline, the data for the time period of interest and for additional time periods may already be received and stored in the server system 308. In some embodiments, the data may be requested by the server system 308. In some embodiments, such as, for example, when surveillance is operating in a real-time manner, the data may be received in an ongoing manner from the client ordering system and the electronic exchange system.

At operation 314 the order data, the order book data and the market data are correlated. As described above in relation to data correlator 220, correlation may involve identifying corresponding order book and/or market records for each record of an order received from the client ordering system.

At operation 316 surveillance, processing is performed for a selected time interval. Further details of this processing is shown below in relation to process 304.

At operation 318 it is determined whether a request is received from an analyst computer system.

If a request was not received, at operation 320, the time interval to be analyzed is adjusted, and the processing returns to operation 316. Adjusting of the time interval may include advancing a time window. For example, a time window of a predetermined fixed duration may be advanced as the processing proceeds. In another example embodiment, the time period being analyzed is increased or expanded as the processing proceeds. In some embodiments, the size of the advancing time window and/or the size of the expanding time window may be automatically determined by the system based on dynamic market conditions. For example, the time window size may be determined based upon whether the market activity frequency and/or volume exceeds certain specified thresholds. In yet another embodiment, the time window may be advanced or expanded while excluding a time duration that the system automatically determines as not including an anomaly that should be subjected to further examination. For example, if no relevant transaction during a certain time interval triggers any of the predetermined pattern detection rules, then the alert and possible preventive and/or recovery action may be triggered faster by dynamically reducing the volume of data presented to the operator in a context-aware manner. In any event, processing includes considering yet unconsidered orders and trades in connection with orders and trades that occurred in an already processed time period.

If it is determined at operation 318 that a request was received, then at operation 322, the received request is processed. Processing of requests from analyst computer systems is further described below in relation to process 306.

At operation 324, it is determined whether the analysis is complete. If it is determined that the analysis is not complete, the processing returns to operation 318. If at operation 324, it is determined that the analysis is complete, then process 302 terminates.

FIG. 3B shows a flowchart of a process 304 that may be performed in the processing of operation 316 described above.

After process 304 is entered, at operation 326 the time interval for the processing (currently selected analysis time interval) is determined.

At operation 328, correlated data for the time interval is processed, and at operation 330, a view is generated and transmitted to the analyst computer system. The generated view may be a view such as view 600 shown in FIG. 6. The processing and view generation may be performed, for example, by module 138 described above.

At operation 332, it is determined whether a pattern is detected in the correlated data being analyzed. Pattern detection may be performed, for example, by the pattern detector 222 described above.

If it is determined that no pattern is detected, then process 304 is complete for the currently selected analysis time interval.

If it is determined that a pattern is detected, at operation 334, processing may be performed in accordance with rules. The rules, such as rules 206, may specify a type of view to be generated, type of alert to be generated, or other action to be taken when one of the patterns 208 is detected in the data being analyzed.

At operation 336, it is determined whether an alert should be generated. If an alert should be generated (for example, if a spoofing pattern is detected), at operation 336, the alert is generated, for example, by alert generator 224, and processing of process 304 for the currently selected analysis time interval is completed.

If it is determined at operation 336 that no alert is required, then the processing associated with process 304 for the currently selected analysis time interval is completed.

FIG. 3C shows a flowchart of a process 306 that may be performed in the processing of operation 322 described above. After the process 306 is entered, at operation 340 the received request from the analyst is identified. The request may be for an order depth view visualization such as that shown in FIG. 6 or 7. For example, if the analyst is reacting to a received spoofing alert, then the analyst may request a view such as view 600 which simultaneously displays spread graph 602 and order depth graph 604. Some received requests may relate to changing a time interval, setting a filter condition, enhancing the visualization etc.

At operation 342, data is gathered from the correlated data in accordance with the received request. If the request pertains to a filter condition, the available data is processed in view of the change to the filter condition.

At operation 344, a suitable data visualization view is determined in accordance with the request and the gathered data. In some embodiments, the selected data visualization may be varied based upon the type of analyst device (e.g., smartphone or PC) capabilities.

At operation 346, a visualization view is generated. At operation 348 the generated view and/or gathered data is transmitted to the requesting analyst computer system. As described above in relation to FIG. 2, the view 600 or any other order depth view visualization may either be generated on server system 108 or on the analyst computer system 110. As noted above, in some embodiments, browser 140 operates as a thin client to which the server system 108 transmits the data and code required for rendering the view on a display of the analyst computer system.

By automatically, and in some embodiments in accordance with configurable rules, generating particular types of displays as described above in response to requests from a user, the system enables the user to react more rapidly and with more accuracy to rapidly occurring market activities. For example, by providing the capability to rapidly respond to a spoofing alert or the like with a corresponding single screen showing at least a tradeable instrument with respect to both the market spread and the market depth, an analyst may be enabled to minimize the effect of that spoof on the market.

Figure 4:
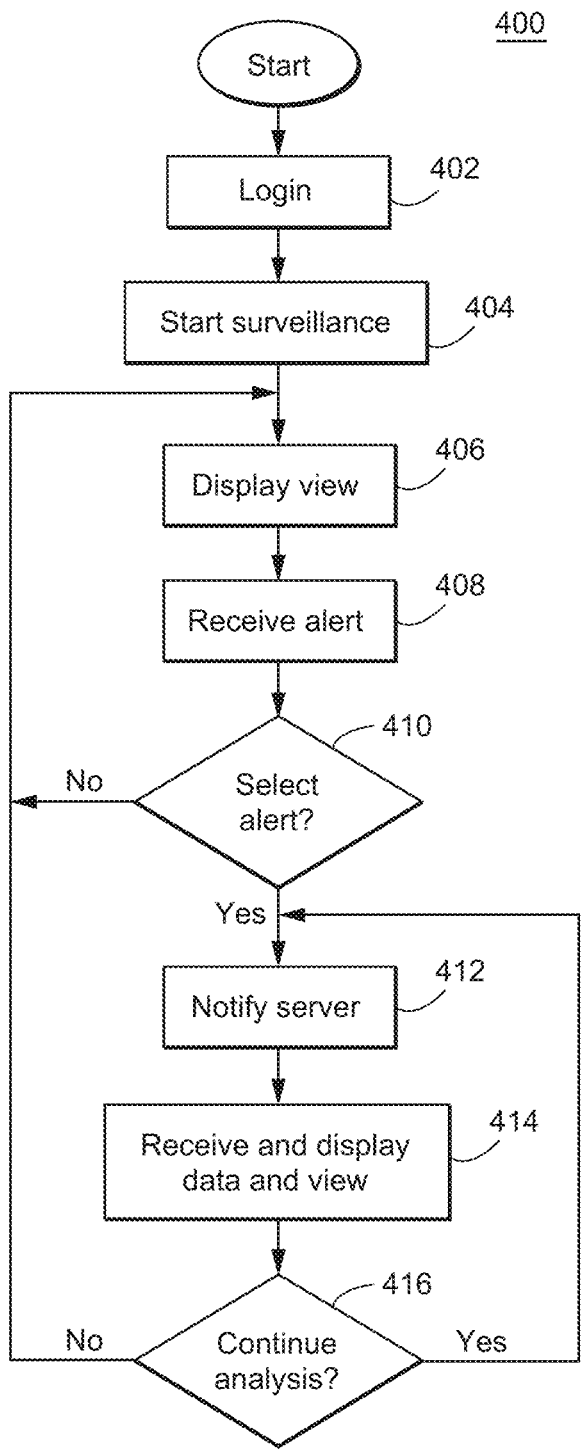
FIG. 4 illustrates a flowchart representing a process performed by an analyst computer system when interacting with a surveillance processing system, according to some example embodiments.

Description of FIG. 4

FIG. 4 illustrates a flowchart representing a process 400 performed by an analyst computer system when interacting with a surveillance processing system, according to some example embodiments.

Process 400 may be entered when an analyst chooses to invoke a surveillance application on browser 140. After process 400 is entered, at operation 402 the analyst logs into the surveillance processing system 108. The logging in process may associate the analyst with a particular broker.

At operation 404, a connection with surveillance processing system 108 may be established and a surveillance session started. The analyst may identify a particular tradeable instrument to perform surveillance on. The surveillance processing system 108 may already have associated the analyst with the broker based upon login and registration configurations. The order data, order book data and market data for the analyst-associated broker and selected tradeable instrument may be made available at processing system 108 as described in relation to FIG. 3.

At operation 406 a view of the order data is displayed. In some embodiments, the analyst may be able to choose from a number of views. In some embodiments, a view such as view 600 may be displayed.

At operation 408, an alert is received. The alert may be related to the surveillance session currently being run by the analyst, or to another tradeable instrument.

At operation 410 a received alert is selected for monitoring, or processing returns to operation 406.

If an alert is selected to act analyze at operation 410, then at operation 412, the surveillance processing server is notified. For example, upon being notified of an alert, the analyst may be able to view some information about the alert, such as, alert type (e.g., spoofing, etc.), tradeable instrument, time of alert, etc. The analyst may then select an alert for monitoring/investigating. Upon selection, the information about the selection is sent to processing system 108.

At operation 414, data and/or views are received from the processing system 108 and are displayed. Processing system 108 may, as described in relation to FIG. 3, gather the required information for the tradeable instrument and broker associated with the alert, generate an appropriate view and/or transmit the gathered data to the analyst computer system for rendering the view (such as, for example, FIG. 6 or FIG. 7) in the browser 140.

At operation 416, it is determined whether to continue the analysis.

If the analysis is to be continued, processing returns to operation 412, and the server is notified of a new request. For example, the analyst may choose to extend or change the time interval being monitored, may choose to zoom in/out of time interval, set a filter for tradeable instrument price range to be considered, set filter for brokers/traders, change selected tradeable instrument etc. Also, in some embodiments, the analyst may switch between views, such as, the views shown in FIGS. 6-9.

If the analysis is complete, processing returns to operation 406, in normal surveillance session mode.

Description of FIG. 5

FIG. 5 illustrates a flowchart representing a process 500 performed by an analyst computer system and/or surveillance processing system when generating a view, according to some example embodiments. In example embodiments, process 500 may be used in an order depth visualization tool to generate any of FIGS. 6-15 and/or views associated with any of operations 330, 346, 406 and 414.

After entering process 500, at operation 502, a first graph is generated. Before the generation of graphs, a tradeable instrument and a broker are identified for use in the graphing. Obtaining order data, order book data and market data related to a particular trading instrument and particular broker was described above in relation to FIGS. 2 and 3.

The first graph may have a time scale on the first axis and a price or value scale on the second axis. Trade objects and order spread is illustrated in the first graph. An example first graph is shown in FIG. 6 spread graph 602. Further description of the first graph, or the spread graph, can be found below in relation to FIG. 6.

At operation 504, a second graph is generated. The second graph may have a time scale on the first axis, and an order volume on the second axis. The cumulative order volume is plotted over time in the second graph. An example second graph is shown in FIG. 6 order depth graph 604. Further description of the second graph, or the order depth graph, can be found below in relation to FIG. 6.

The second graph may also have a representation of the order depth (also referred to as order book depth). The order depth refers to the volume of bids and offers for a tradeable instrument at or within a certain price point. In embodiments, the order depth of bids and offers within a predetermined number of price ticks (e.g., 5 price ticks) may be superimposed on the cumulative volume depiction in the second graph.

At operation 506, a selected entity such as a broker or trader is identified, and the order volume for that selected entity is mapped on the second graph. The identifying of the entity may be through a listing in a legend area such as area 606 shown in FIG. 6. Upon selection of a trader, for example, the trade volumes for that selected trade are superimposed on the cumulative volume of bids and offers.

Optionally, in some embodiments, the trade volumes for the selected trader are superimposed in the first graph.

Also optionally, a line graph indicating the net balance or the order book for the selected tradeable instrument may be superimposed in the second graph.

At operation 508, the first graph and the second graph are displayed together. Further description related to the view generation is below in relation to FIGS. 6 and 7.

Description of FIG. 6

FIG. 6 illustrates an example view 600 generated by an order depth visualization tool, according to some example embodiments. View 600 comprises a spread view graph 602 simultaneously displayed with an order depth graph 604.

The spread view graph 602 illustrates order spread and the trade prices. In some embodiment, the spread view graph 602 also illustrates trade volumes. The x-axis 608 of the spread view graph 602 may be a time scale, and the y-axis 610 may be price or value. Executed trades are indicated on the graph by placing, for each trade, a respective trade object 612 according to its time of execution (e.g., x-axis) and buy/sell price or value (e.g., y-axis). In some embodiments, the y-axis position for trade object 612 may be based on the price, and in another embodiment the object position may be based on value (e.g., price per unit×quantity).

The spread view graph 602 illustrates the spread, that is, it illustrates the difference between highest bid price and the lowest offer price. The area 614 in the graph shows the shape of the evolution of the bid price or bid value in accordance with time. The area 616 (that is, the area between the lower edge of area 616 and upper edge of area 614) likewise shows the evolution of the offer price or offer volume over time. The area 618 in between areas 614 and 616 represents the spread, i.e. the difference between the highest bid price/value and the lowest offer price/value. At least in some embodiments, individual trade volumes 623 may also be illustrated, within area 614, relative to the volume threshold 621.

A start trade object 620 and an end trade object 622 may bookend trades in the surveillance session shown on the displayed graph. Tall bars 624 and 626, or other distinctive indicators, may be displayed on the graph associated with each of objects 620 and 622, respectively, to indicate the beginning and end of the illustrated surveillance session.

The order depth graph 604 has a time scale on the x-axis 628 and cumulative order volume as the y-axis 630. The cumulative volume of buy orders (bids) 640, and the cumulative volume of sell orders (offers) are plotted for each point in time on the x-axis. According to an embodiment, the orders may be plotted as lines or bars, such that bids extend from the x-axis in a different direction than offers. For example, as shown in view 600, bids are displayed extending upwards (i.e. positive volume values on the y-axis) and offers are shown extending downwards (i.e. negative volume values on the y-axis). In some embodiments, the illustrated cumulative volume of bids may be in a first color or pattern, and the cumulative volume of sell orders (offers) 642 are mapped on the x-axis in a second color or pattern. In some example embodiments, the cumulative offer volumes are shown in a color or pattern that is different from the cumulative bid volumes and extending in a different direction than the cumulative offer volume. For example, bid volume can be shown in green while the offer volume may be shown in red.

In some example embodiments, the two graphs 602 and 604 are displayed one above the other so that they are aligned on the time axis.

The view 600 may also include a legend area 606. The legend area 606 includes a listing of entities participating as buyers and/or sellers. The listing of entities may be a filtered list of traders and/or brokers whose order and/or trade information is displayed in graphs 602 and/or 604. Filtering may also be performed on other aspects of the broker order data and/or market data, such that the type of information presented in graphs 602 and 604 can be selected.

The legend area 606 may, by default, display a filtered list of entities (e.g., traders) associated with a broker (e.g., the broker associated with the analyst accessing the order depth visualization tool). For example, in some example embodiments, where the client is broker B and traders t1-t10 trade through broker B, the filtered list will include traders t1-t10. The filter may be configurable to list brokers and/or traders above a predetermined threshold number of bids and/or offers.

A bar graph representation of the relative volume of bids and offers of each of the listed entities may be overlaid on the listing of entities. For example, the green or red (e.g., shown in this document as different greyscale shading) overlaid in the listing in legend area 606 represents the bids (on the left) and the offers (on the right), respectively. From the listing with the overlaid bar graph, the analyst can quickly determine which of the listed entities have bid, who have offered, and the relative size of the bids or offers.

Thus, the legend area 606, which allows viewing and selection of trading entities, also functions as an equity visualization, such that trades (and/or orders) by a particular security/trader/trading house can be identified by applying a color mask. Of course, the entity and filter type are not limited to broker and a volume amount and can be a variety of different options. For example, an entity type could be all possible trading entities such as an exchange member, a broker firm, an actual broker, or a market maker. Likewise, a filter type could be a financial instrument type (e.g., a trade-able asset of any kind) such as equity class types as stocks/shares, stock options, equity futures or other so called exotic instruments. There are also debt type class instruments such as bonds/loans, bond futures, options on bond futures, and/or interest rate swaps. Likewise, there may also be ETFs, and foreign exchange (FX) type of instruments such as spot FX, currency futures and various options of FX products.

In some embodiments, view 600 may also include a header 646. The header 646 may display high level or aggregated information. In a first area 648 of the header, totals for a number of trades, volume and value are shown for all the entities appearing in the list shown in 606. In a second area 650 of the header, the same or similar total fields can be shown for a selected entity (e.g., a trader). In a third area 652, the high and low prices and the first and last prices and the like for the particular tradeable instrument for which information displayed for the current trading session can be displayed.

Also, one or more individual entities' (e.g., broker or trader) orders and trades can be displayed in a manner distinguishable from other entities. The distinguishing of one or more individual entities in view 600 may be based upon respective colors or patterns being used. The individual entities to be distinguishably displayed view 600 can be selected from the listing in legend 606.

According to an embodiment, view 600 illustrates a display provided by an order depth visualization tool before an analyst starts drilling into certain aspects in order to more closely visualize suspected spoofing activity. For example, view 600 (as well as each of the views 700, 800, 900, 1000, 1100, 1200, 1300, 1400 and 1500) may be rendered in browser 140 after being generated by the surveillance processing system 108 and/or by the browser 110.

Upon receiving a spoofing alert, which as described above, is intended to alert an analyst to an occurrence of potential market manipulation, an order depth view tool can be invoked. The invoking of the tool may be performed manually or automatically. For example, the receiving of certain alerts may cause the tool to be automatically invoked. Upon startup of the tool to generated view 600 (or, e.g., view 700), the time scale to be displayed may be manually or automatically selected based upon when the alert was generated. For example, if the alert was generated at time t, then the displayed time interval may be a time interval including time t. The location of time t in the selected time interval may be configuration-dependent or may be automatically determined by the system based upon the time of occurrence of the potential market manipulation. The length of the time interval may be determined by one or more of configuration, size of time tick (e.g., granularity of time display along the x-axis), and the display or browser view area dimensions.

Figure 7:
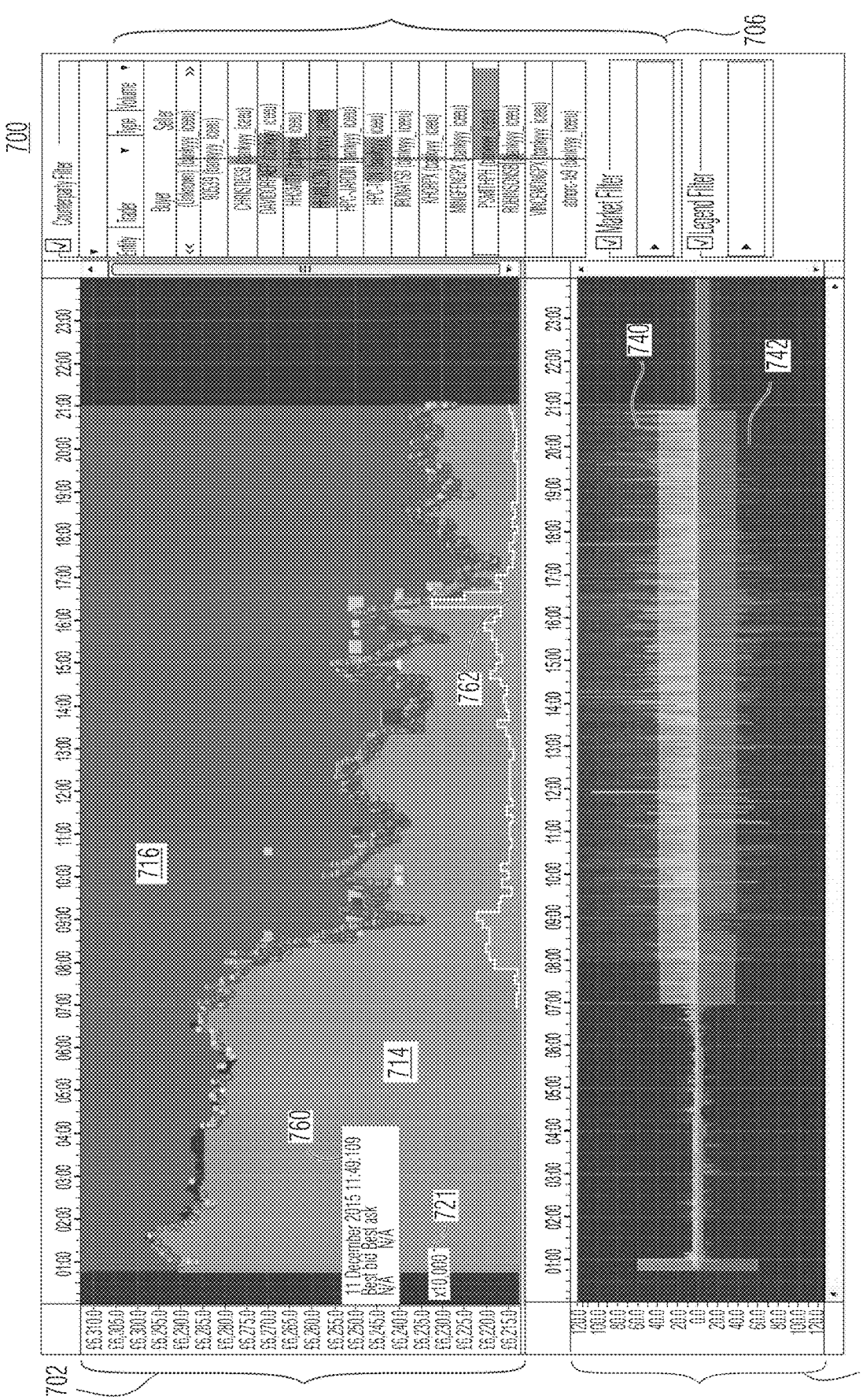

Description of FIG. 7

FIG. 7 illustrates another example view 700 generated by an order depth visualization tool, according to some example embodiments.

The view 700 shows, to the analyst, trading activity between 1:00 and 21:00 hours. In the spread view portion 702, as also noted above, the shape of area 714 represents the evolution of the highest bid price throughput the displayed trading period and the shape of area 716 represents the evolution of the lowest offer price. The overlay graph 762 illustrates the volume of buy and sell trades of the traders listed in legend 706 relative to a trade volume indicator 721. The information popup 760 may display information such as the best buy and sell (or best bid and offer) prices at an indicated time.

In the order depth view portion 704, as noted above, the cumulative volume of orders is displayed. As can be seen, whereas the bid volume 740 is shown to 120 order size (e.g., 120 contracts or lots) the higher density of the graph can be seen in some of the lower order sizes. Similar characteristics are observed also in the offer graph 742.

View 700 may be generated in response to an analyst requesting "zoom in" to a more restricted cumulative volume range than that shown, for example, in view 600. The volume range restriction, which the analyst can activate by entering/selecting it as a filter, can be seen when graphs 604 and 704 are compared: the y-axis of graph 604 ranges from −2000 to +2000, whereas the y-axis of graph 704 ranges from −120 to +120.

By restricting the cumulative volume range displayed, the analyst is able to quickly and more clearly view the effects of individual orders. The analyst can quickly see that, although there is some level of trading activity before that, the trading activity increases close to 7:00 hours, and that starting at about 8:00 hours the activity also includes some, but relatively few, large orders both on the buy side and the sell side. This is indicated in the graph by the lighter greyscale shading (or a different color) extending to 120 order size or over.

Another available filter may activate a price range restriction. For example, the analyst may input/select a filter to restrict the orders being considered to orders within a certain number of price ticks (e.g., within 10 price ticks) on either side of the market price, or to bids within a certain number of price ticks from the highest bid and offers within a certain number of price ticks from the lowest offer price. With a price range filter such as that described above, the analyst is able to focus on bids that are most likely to have an effect on the market. This is helpful in detecting spoofing etc., because only bids or offers that are close to the market price will actually have an effect and move the market, i.e., 5 spoofing bids at 40 price ticks away is unlikely to affect a market with some depth if there are other bids at 10 price ticks away.

Figure 8:
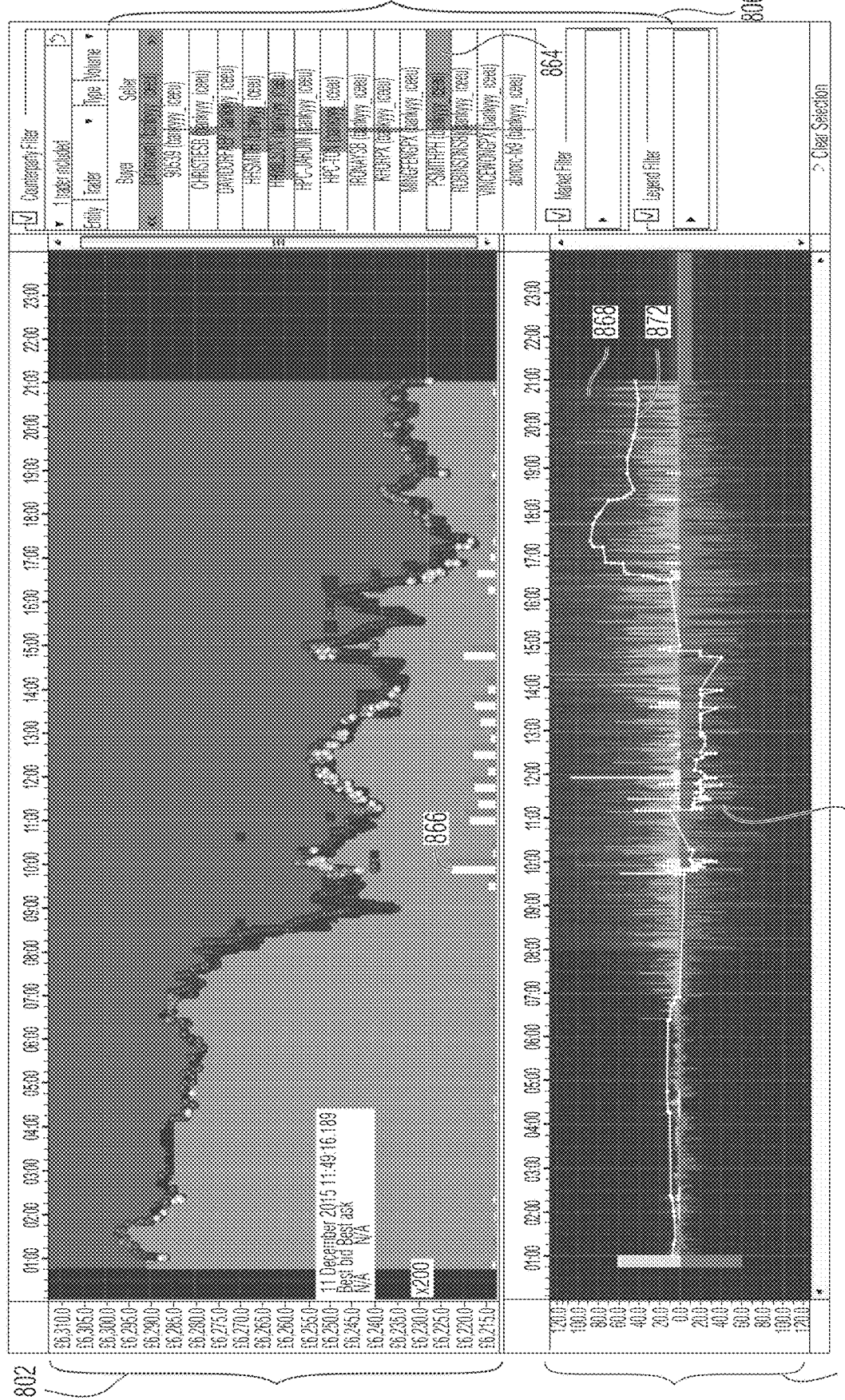

Description of FIG. 8

FIG. 8 illustrates another example view 800 generated by an order depth visualization tool upon, for example, selecting one or more entities whose individual activities are to be displayed, according to some embodiments.

For example, view 800 may be displayed upon the analyst selecting a trader "PSMITHPH" by highlighting the identifier 864 in the legend area 806. The selection may, for example, be automatic based on a received alert. For example, the tool may obtain the potential spoofer identifier from a received alert, and identify a matching entry in the listing 806. In some embodiments, the analyst manually selects the trade from the displayed list.

Upon the selection, the spread view 802 is overlaid with the buy and sell trade activity (identified separately) 866 of the selected trader. Additionally, the bid volume 868 and offer volume 870 for the selected trader are overlaid in the order depth view 804.

A trend line 872 may be drawn on the order depth view overlaid with the order activity volume of the selected trader. The trend line represents the net orders for the selected trader. The value of the trend line at a particular time shows the net of the pending order volume (e.g., bids less offers) for the selected trader in the order book at that time.

The view 800 shows that the selected trader placed several large orders on both sides of the order book and (possibly) deleted them shortly after. The large orders are represented by the tall bars on the bid and offer sides of the order depth view. The analyst may quickly observe from the spread view 802 that at no corresponding trades were made by the selected trader—based upon trade objects and/or trade volumes shown in the spread view 802. Based on view 800, it is also observable that this is a pattern of behavior for the selected trader.

Figure 9:
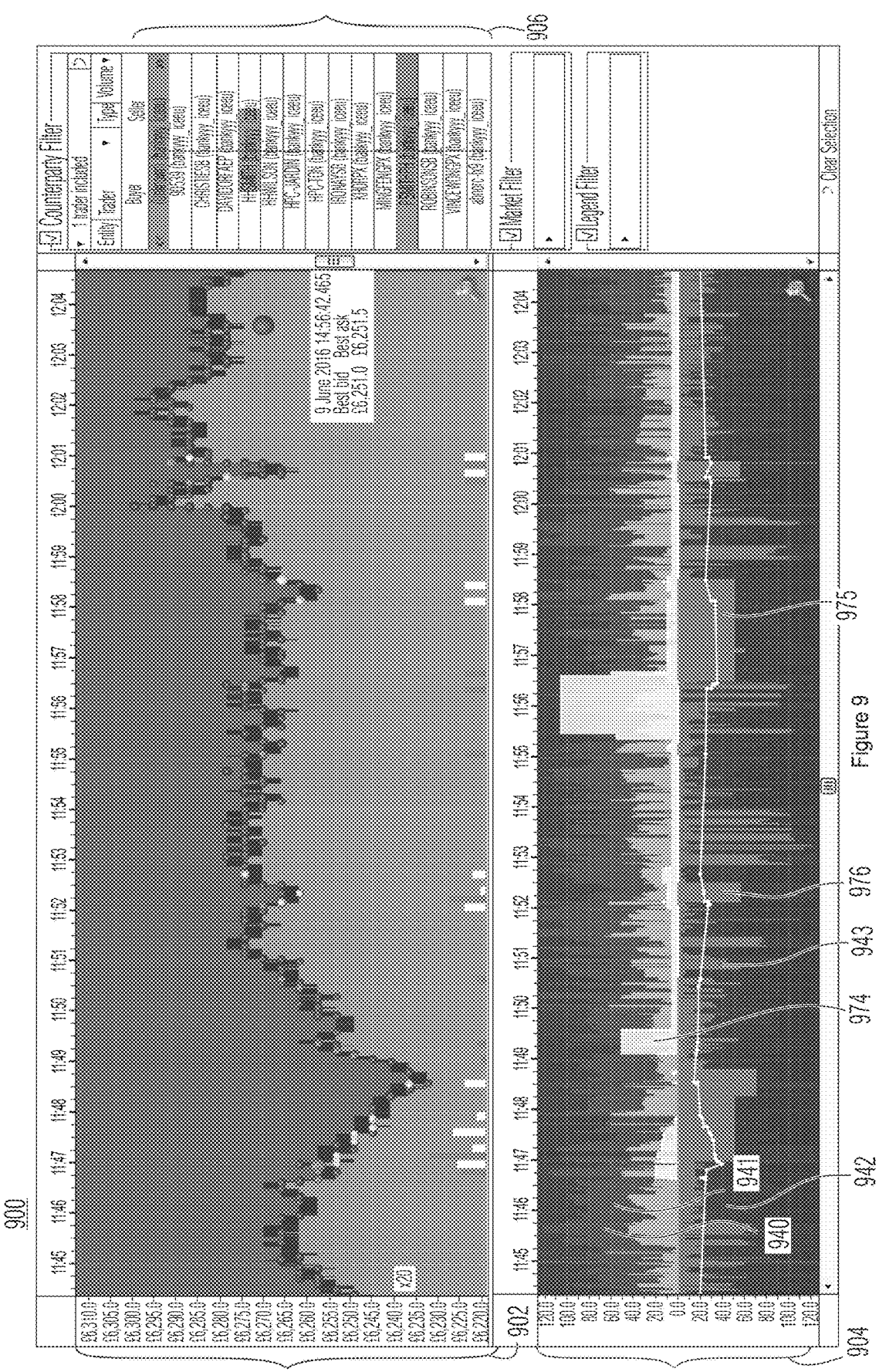

Description of FIG. 9

FIG. 9 illustrates an example view 900 generated by an order depth visualization tool upon, for example, an analyst who is viewing view 800 chooses to zoom in on a particular time period of interest, according to some example embodiments. For example, from view 800, the analyst may observe the suspicious behavior around the 11:45 hours mark, and then choose to zoom into that time period.

The listing 906 is automatically adjusted so that it lists a subset of entities listed in 806 such that only those entities whose trades and orders are shown on spread view 902 and order depth view 904 now are listed. This subset of entities are the only traders who used the client ordering system to trade during the newly selected (zoomed in) time period.

In view 900, the order depth view 904 is observable with the cumulative bid volume 940 in a first color or pattern (e.g., green, shown in this document in a first level of greyscale shading over the background in order depth view graph 904 above the x-axis) and the cumulative offer volume 942 in a second color or pattern (e.g., red, shown in this document in a second level of greyscale shading in order depth view graph 904 below the x-axis) in the order book. The order depth to a predetermined or configured number of price ticks (e.g., within 5 price ticks from the highest bid or the lowest offer) is shown for bids 941 in a third color or pattern (e.g., sharp green, shown in this document in an third level of greyscale shading over the cumulative bids) and for offers 943 in a fourth color or pattern (e.g., sharp red, shown in this document in an fourth level of greyscale shading over the cumulative offers). The selected trader's bids 974 are shown in a fifth color or pattern (e.g. yellow, shown in this document in the sharpest greyscale shading above the x-axis), and the selected trader's offers 975 are shown in a sixth color or pattern (e.g. purple, shown in this document in the sharpest greyscale shading below the x-axis in graph 904).

From view 900, it is possible to observe individual instances of bids and offers where spoofing may have occurred. In view 900, it is observable that the selected trader has placed, among his bids 974, several small bids in the period starting at about 11:49 hours, soon followed by a large (e.g., large in comparison to the size of the preceding bids placed) offer about 11:52 hours. The several small bids seem to then have been deleted, as soon as the offer results in a trade. The analyst can determine whether the bids have resulted in buy by looking at the corresponding time(s) in the spread view.

By training analysts to identify this pattern visually, semi-automatically or by performing it automatically, quick identification of manipulatory patterns becomes possible. By observing the entire session, as made possible by the order depth visualization tool, one can rapidly determine if the alert represents a pattern of behavior. In addition, it is just as easy to observe that the alert is a false positive—this results in reducing the time and resources required to escalate/deescalate such alerts.

Figure 10:
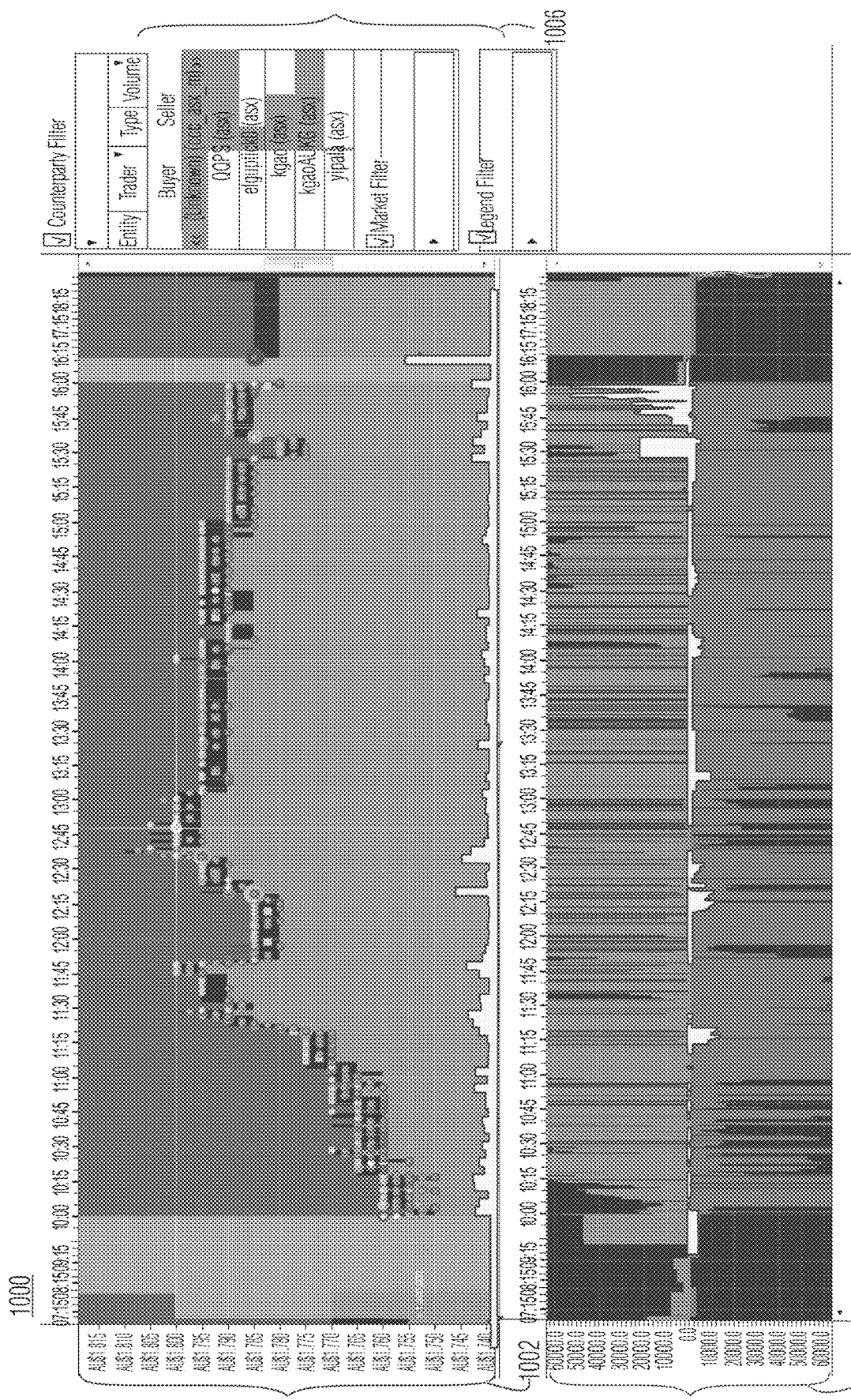

Description of FIG. 10

FIG. 10 illustrates another example view 1000 provided by an order depth visualization tool according to some example embodiments.

View 1000 enables the analyst to observe potential manipulation outside of their organization that is still visible in the order data. This in turn may result in the reporting of the behavior to the respective exchange or regulator, further increasing the chances of a market manipulator being detected and stopped, and thus improving the reliable operation of the electronic exchange and the computer systems of the electronic exchange.

In view 1000, the spread view 1002 indicates that the traders' behavior is benign. However, the order book status shown in order depth view 1004 exhibits some extraordinary behavior. Specifically, the order book as shown in graph 1004 shows that the bid and ask volumes regularly oscillate from very high to very low. This can be a pattern of spoofing or layering. However, the legend area 1006 shows, however, that only one trader from the broker is buying, and as discussed above the analyst can quickly confirm that the behavior of his trader is not related to any spoofing.

Figure 11:
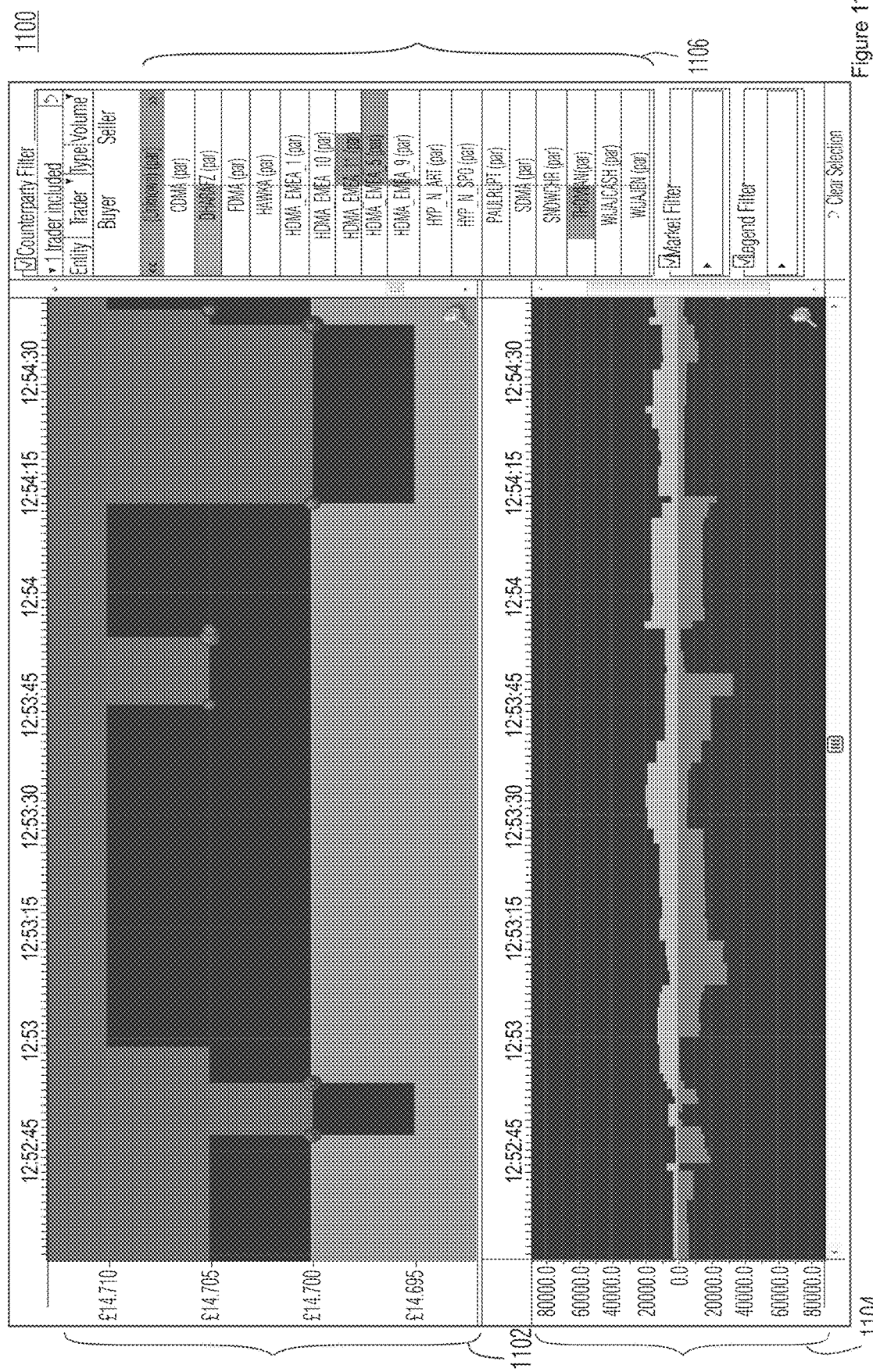

Description of FIG. 11

FIG. 11 illustrates another example view 1100 provided by an order depth visualization tool according to some example embodiments.

When prices are flat, very little information can be gathered from the spread view, such as, in situations shown in spread view 1102. The order depth view, according to embodiments, as shown, for example in view 1100, allows the analyst to see inside the process to understand what is happening behind the trades.

Figure 12:
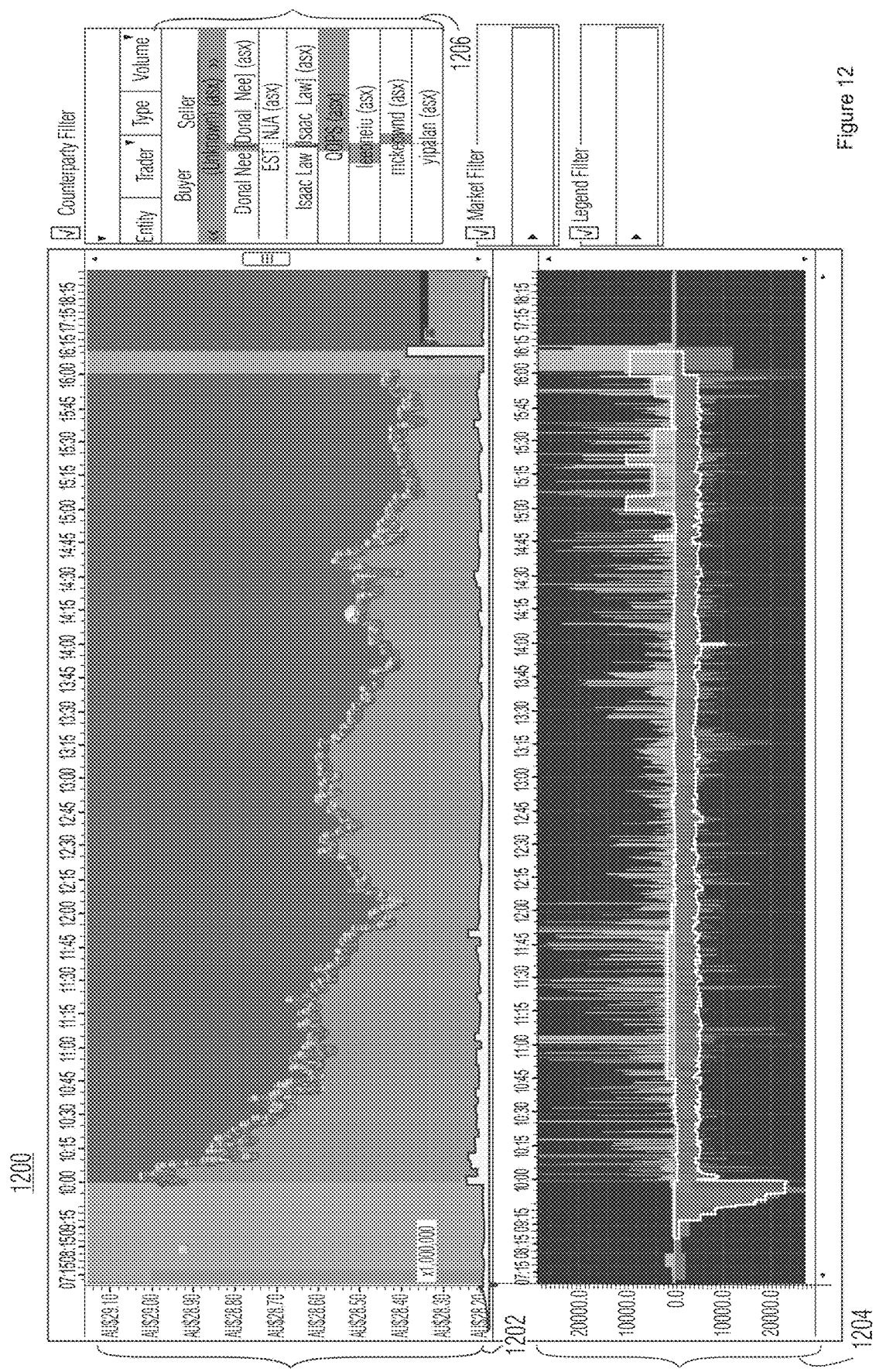

Description of FIG. 12

FIG. 12 illustrates another example view 1200 provided by an order depth visualization tool according to some example embodiments.

Here also, information helpful to understanding the shape of the price variations shown in spread view 1202 can be found in the order depth view 1204.

Figure 13:
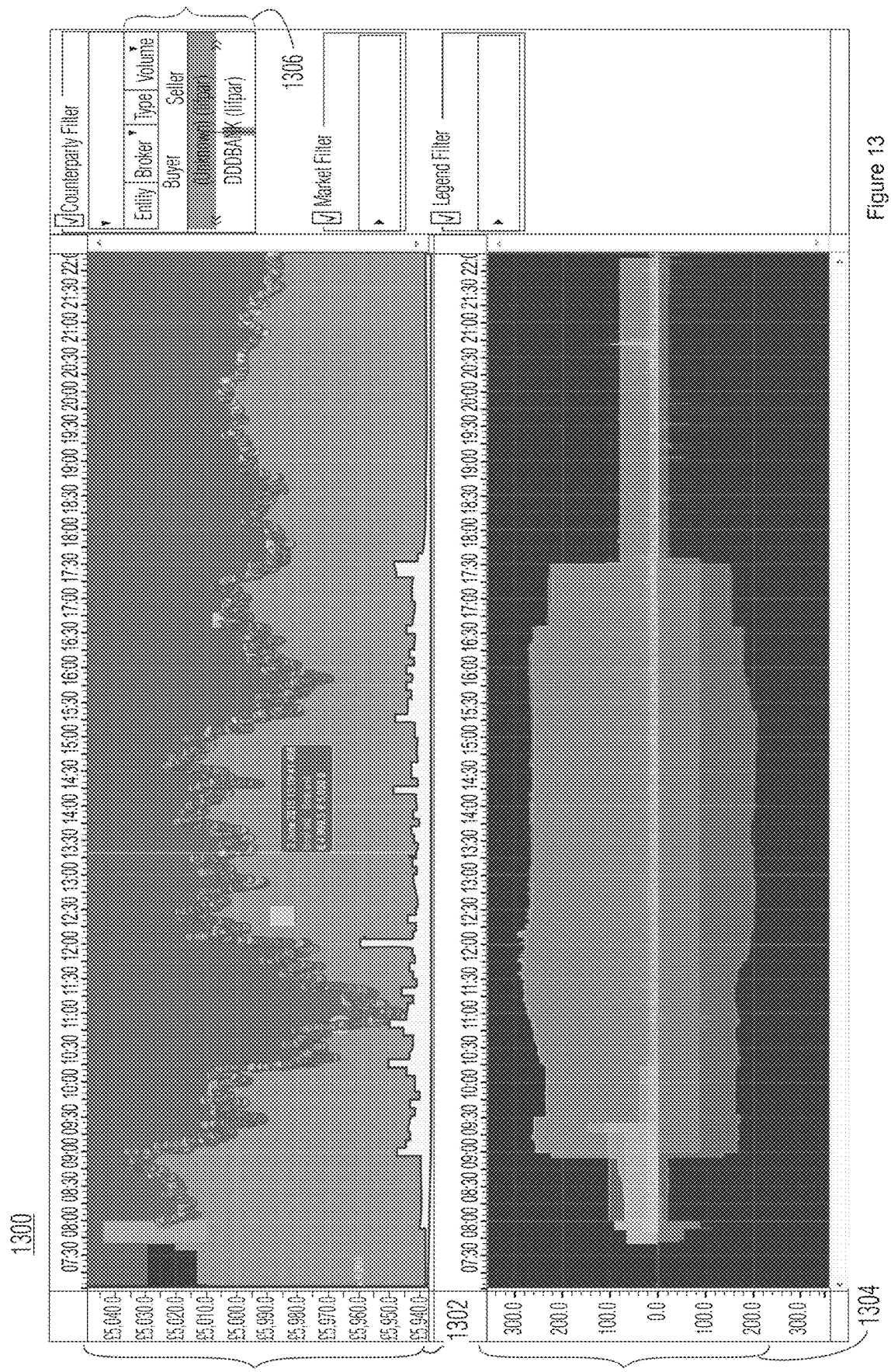

Description of FIG. 13

FIG. 13 illustrates another example display view 1300 provided by an order depth visualization tool according to some example embodiments.

Using view 1300, it is possible to observe market makers throughout the course of the day and check that they are fulfilling price/volume requirements. In this instance, the trader is making markets deep into the book, further than the quote level data show.

Figure 14:
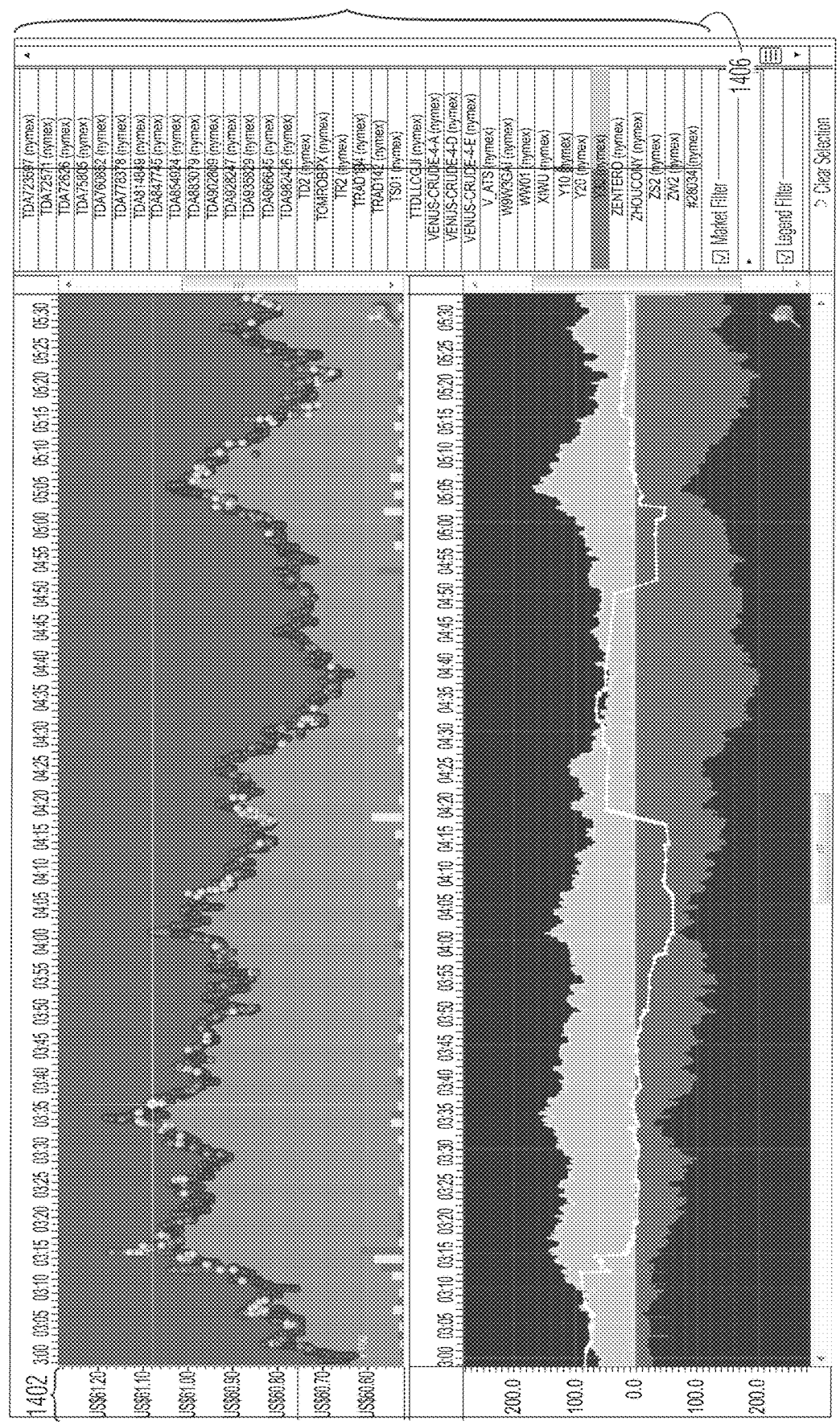

Description of FIG. 14

FIG. 14 illustrates another example view 1400 provided by an order depth visualization tool according to some example embodiments. View 1400 is another example of market maker detection based on the trader's alternating buy and sell patterns.

Figure 15:
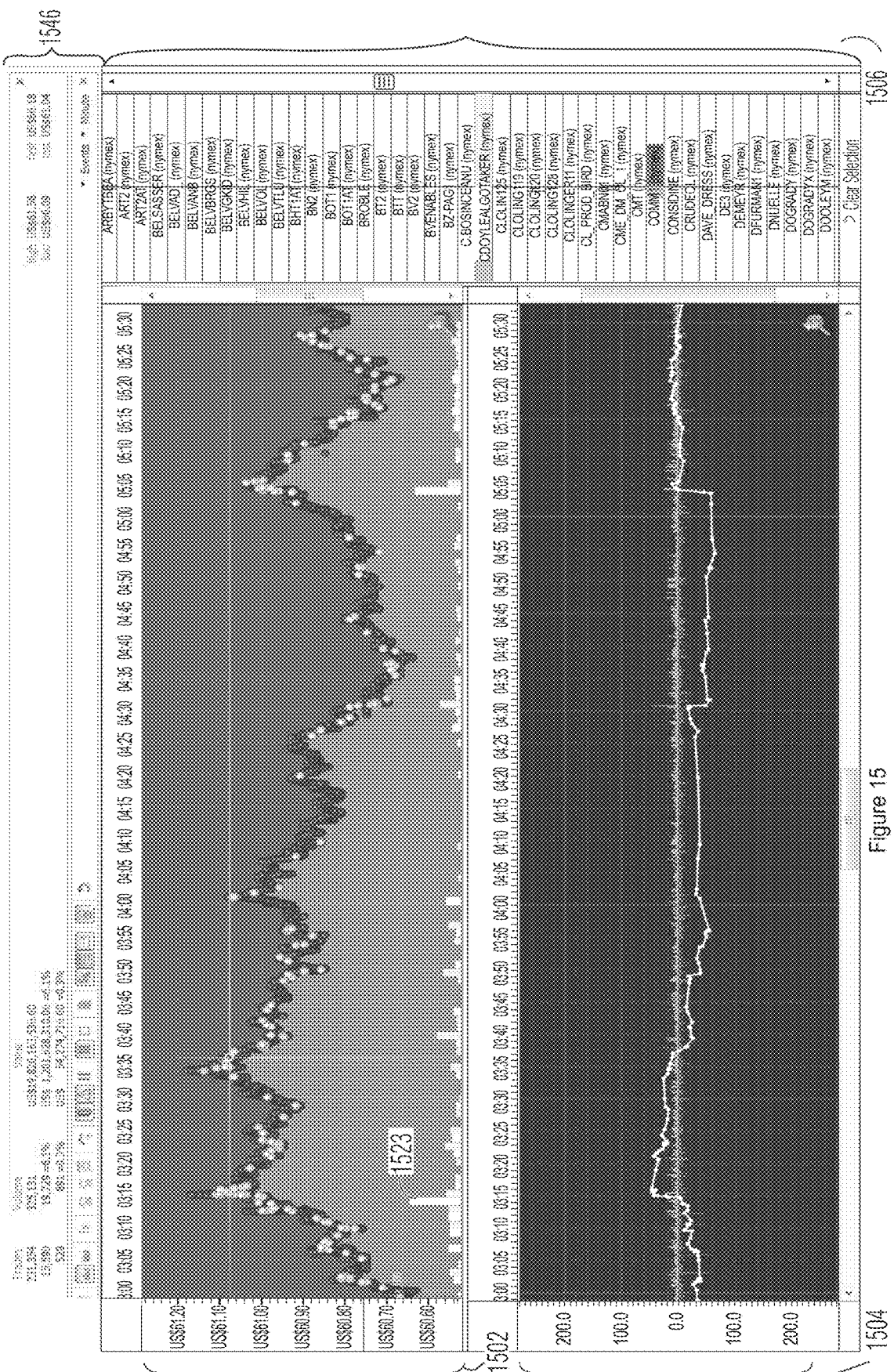
Figure 16:
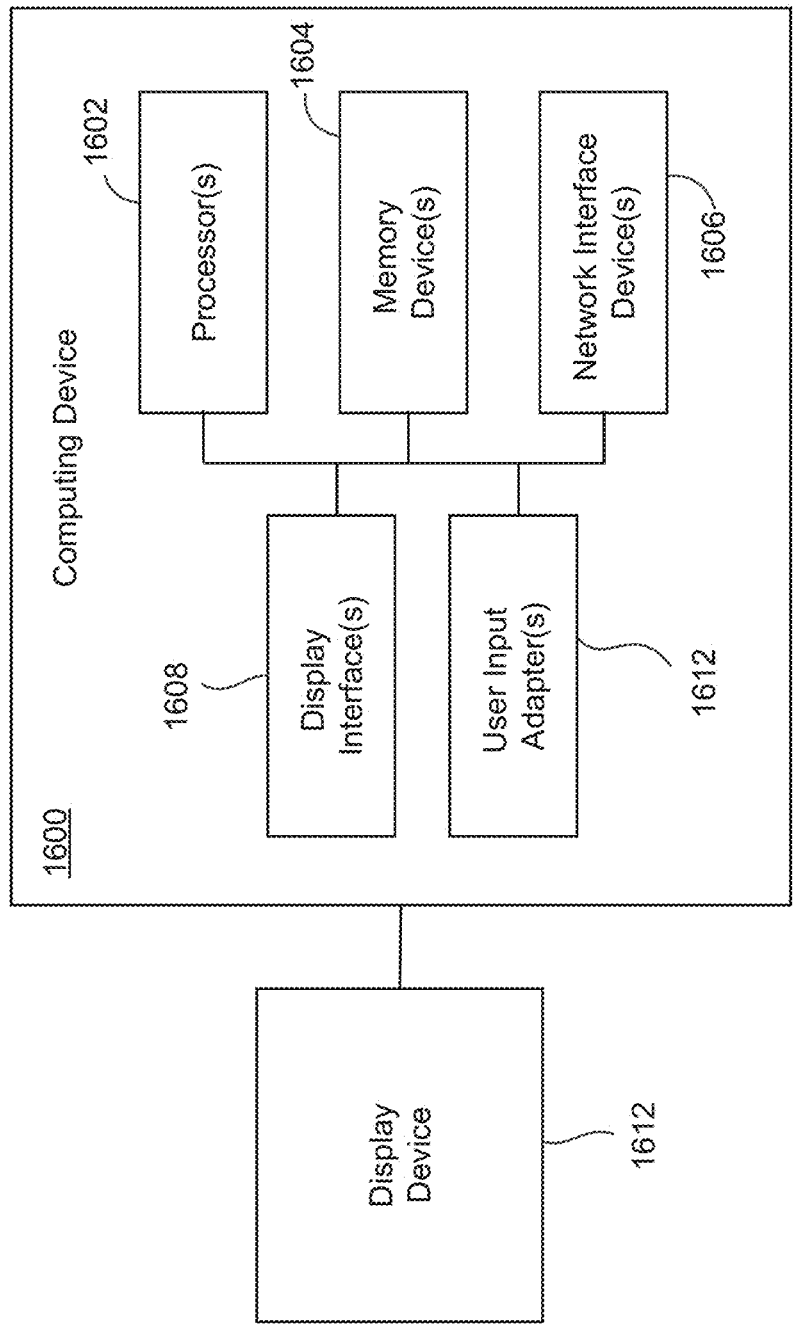
FIG. 16 shows an example computing device that may be used in some embodiments to implement features described herein.

Description of FIG. 15

FIG. 15 illustrates another example view 1500 provided by an order depth visualization tool according to some example embodiments.

This view 1500 allows identifying a price taker. As can be seen, this trader is very active. However, this trader does not, during this entire period displayed, float resting orders. Rather, this trader's orders simply hit and lift as appropriate.

Description of FIG. 16

FIG. 16 is a block diagram of an example computing device 1600 (which may also be referred to, for example, as a "computing device," "computer system," or "computing system") according to some embodiments. In some embodiments, the computing device 1600 includes one or more of the following: one or more processors 1602; one or more memory devices 1604; one or more network interface devices 1606; one or more display interfaces 1608; and one or more user input adapters 1610. Additionally, in some embodiments, the computing device 1600 is connected to or includes a display device 1612. As will explained below, these elements (e.g., the processors 1602, memory devices 1604, network interface devices 1606, display interfaces 1608, user input adapters 1610, display device 1612) are hardware devices (for example, electronic circuits or combinations of circuits) that are configured to perform various different functions for the computing device 1600.

In some embodiments, each or any of the processors 1602 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1602 uses an instruction set architecture such as x86 or Advanced RISC Machine (ARM).

In some embodiments, each or any of the memory devices 1604 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1602). Memory devices 1604 are examples of non-volatile computer-readable storage media.

In some embodiments, each or any of the network interface devices 1606 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1608 is or includes one or more circuits that receive data from the processors 1602, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1612, which displays the image data. Alternatively or additionally, in some embodiments, each or any of the display interfaces 1608 is or includes, for example, a video card, video adapter, or graphics processing unit (GPU).

In some embodiments, each or any of the user input adapters 1610 is or includes one or more circuits that receive and process user input data from one or more user input devices (not shown in FIG. 16) that are included in, attached to, or otherwise in communication with the computing device 1600, and that output data based on the received input data to the processors 1602. Alternatively or additionally, in some embodiments each or any of the user input adapters 1610 is or includes, for example, a PS/2 interface, a USB interface, a touchscreen controller, or the like; and/or the user input adapters 1610 facilitates input from user input devices (not shown in FIG. 16) such as, for example, a keyboard, mouse, trackpad, touchscreen, etc.

In some embodiments, the display device 1612 may be a Liquid Crystal Display (LCD) display, Light Emitting Diode (LED) display, or other type of display device. In embodiments where the display device 1612 is a component of the computing device 1600 (e.g., the computing device and the display device are included in a unified housing), the display device 1612 may be a touchscreen display or non-touchscreen display. In embodiments where the display device 1612 is connected to the computing device 1600 (e.g., is external to the computing device 1600 and communicates with the computing device 1600 via a wire and/or via wireless communication technology), the display device 1612 is, for example, an external monitor, projector, television, display screen, etc. . . . . .

In various embodiments, the computing device 1600 includes one, or two, or three, four, or more of each or any of the above-mentioned elements (e.g., the processors 1602, memory devices 1604, network interface devices 1606, display interfaces 1608, and user input adapters 1610). Alternatively or additionally, in some embodiments, the computing device 1600 includes one or more of: a processing system that includes the processors 1602; a memory or storage system that includes the memory devices 1604; and a network interface system that includes the network interface devices 1606.

The computing device 1600 may be arranged, in various embodiments, in many different ways. As just one example, the computing device 1600 may be arranged such that the processors 1602 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1600 may be arranged such that: the processors 1602 include two, three, four, five, or more multi-core processors; the network interface devices 1606 include a first network interface device that implements Ethernet and a second network interface device that implements WiFi and/or Bluetooth; and the memory devices 1604 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the client ordering computer system 102, electronic exchange computer system 104, surveillance processing system 108, and analyst computer systems 112, each of which will be referred to individually for clarity as a "component" for the remainder of this paragraph, are implemented using an example of the computing device 1600 of FIG. 16. In such embodiments, the following applies for each component: (a) the elements of the 1600 computing device 1600 shown in FIG. 16 (i.e., the one or more processors 1602, one or more memory devices 1604, one or more network interface devices 1606, one or more display interfaces 1608, and one or more user input adapters 1610), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1604 (e.g., in various embodiments, in a volatile memory device such as a RAM or an instruction register and/or in a non-volatile memory device such as a flash memory or hard disk) and all actions described herein as performed by the software modules are performed by the processors 1602 in conjunction with, as appropriate, the other elements in and/or connected to the computing device 1600 (i.e., the network interface devices 1606, display interfaces 1608, user input adapters 1610, and/or display device 1612); (c) alternatively or additionally, to the extent it is described herein that the component processes and/or otherwise handles data, in some embodiments, such data is stored in the memory devices 1604 (e.g., in some embodiments, in a volatile memory device such as a RAM and/or in a non-volatile memory device such as a flash memory or hard disk) and/or is processed/handled by the processors 1602 in conjunction, as appropriate, the other elements in and/or connected to the computing device 1600 (i.e., the network interface devices 1606, display interfaces 1608, user input adapters 1610, and/or display device 1612); (d) alternatively or additionally, in some embodiments, the memory devices 1602 store instructions that, when executed by the processors 1602, cause the processors 1602 to perform, in conjunction with, as appropriate, the other elements in and/or connected to the computing device 1600 (i.e., the memory devices 1604, network interface devices 1606, display interfaces 1608, user input adapters 1610, and/or display device 1612), each or any combination of actions described herein as performed by the component and/or by any software modules described herein as included within the component.

The hardware configurations shown in FIG. 16 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 16, (e) via other hardware arrangements, architectures, and configurations, and/or via combinations of the technology described in (a) through (e).

Technical Advantages of Described Subject Matter

In certain example embodiments, an improved capability to quickly and reliably detect and handle occurrences of certain anomalies in electronic exchanges is provided. Views provided by embodiments, such as view 600, present data from client orders, the order book and executed trades on a single screen in a manner that an analyst can quickly see the interrelations between orders, trades and order patterns. For example, the described simultaneous display of the order spread and the order depth, particularly in response to an alert generated due to a detected anomalous pattern of activity in a rapidly moving tradeable instrument market, enables an analyst to rapidly react with accuracy so that preventive and/or corrective action can be taken. Moreover, in addition to enabling rapid reaction preventive and corrective action, such displays and the generation of such displays enable the reduction of false positives and the like, thereby improving the efficiency of associated surveillance and/or trading exchange systems. The improved accuracy and efficiency provided by the described detection of anomalous patterns and the views such as FIGS. 6-10 may improve the efficiency and reliability of electronic trading systems even in high volume and/or high frequency trading scenarios enabled by all-electronic trading.

The technical features described herein may thus improve the security, reliability and speed with which electronic exchange computer systems operate to provide an electronic exchange service.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 3-5, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system, comprising:
   at least one memory;
   at least one processor configured to:
      access broker order data and executed trade information in the at least one memory, wherein the broker order data represent orders transmitted by an external computer to an electronic exchange to trade in a tradeable instrument, and wherein the executed trade information includes information on trades executed by the electronic exchange based on the orders;
      correlate the executed trade information and broker order data;
      generate, based upon the correlated data, a view arranged to simultaneously display order spread, trade price for executed trades, and order book depth over a time period; and
      output the generated view.

2. The computer system according to claim 1, wherein the view comprises a first graph representing the order spread and the trade price for executed trades and a second graph representing the order book depth.

3. The computer system according to claim 2, wherein the first graph further comprises trade volume for at least one of the executed trades.

4. The computer system according to claim 2, wherein the first graph includes time on an x-axis and price or value on a y-axis, wherein the second graph includes time on an x-axis and volume on a y-axis, and wherein the first and second graphs are aligned on respective x-axes.

5. The computer system according to claim 2, wherein the second graph further comprises a graph representing a cumulative volume of said orders and a graph representing order book depth.

6. The computer system according to claim 5, wherein the graph representing order book depth is derived from orders within a predetermined distance from a market price and excludes orders further than the predetermined distance from the market price.

7. The computer system according to claim 6, wherein said representing order book depth includes varying color, intensity of color or pattern, in accordance with the order book depth.

8. The computer system according to claim 5, wherein the second graph further comprises a graph representing volume of orders of at least one selected entity.

9. The computer system according to claim 8, wherein the second graph further comprises a graph representing a net volume of said at least one selected entity.

10. The computer system according to claim 8, wherein the first graph further comprises a graph representing volume of executed trades of said at least one selected entity.

11. The computer system according to claim 10, wherein said graph representing a net volume of said at least one selected entity and said graph representing volume of executed trades of said at least one selected entity are displayed in response to selection of said selected entity.

12. The computer system according to claim 11, said selection of said selected entity is automatically performed based upon a received alert message.

13. The computer system according to claim 1, wherein a content of the view is automatically changed in accordance with one or more received alert messages.

14. The computer system according to claim 13, wherein the at least one processor is further configured to detect a predetermined pattern in the correlated data and, in response to detecting the predetermined pattern in the correlated data, to generate at least one of said alert messages.

15. A method comprising:
accessing, using at least one processor of a computer, broker order data and executed trade information in at least one memory, wherein the broker order data represent orders transmitted by an external computer to an electronic exchange to trade in a tradeable instrument, and wherein the executed trade information includes information on trades executed by the electronic exchange based on the orders;
correlate using at least one processor, the executed trade information and broker order data;
generate, based upon the correlated data and using at least one processor, a view arranged to simultaneously display order spread, trade price for executed trades, and order book depth over a time period; and
output the generated view to a display device.

16. The method according to claim 15, further comprising displaying a first graph representing the order spread and the trade price for executed trades and a second graph representing the order book depth.

17. The method according to claim 15, further comprising detecting a predetermined pattern in the correlated data, and in response to the detecting, automatically changing a content of the view in accordance with at least the detected pattern.

18. The computer system according to claim 13, wherein the at least one processor is further configured to detect a predetermined pattern in the correlated data and, in response to detecting the predetermined pattern in the correlated data, to generate at least one of said alert messages in response to the detecting.

19. A non-transitory tangible storage medium storing instructions which, when executed by a processor of a computer, causes the computer to perform operations comprising:
accessing, using at least one processor, broker order data and executed trade information in at least one memory, wherein the broker order data represent orders transmitted by an external computer to an electronic exchange to trade in a tradeable instrument, and wherein the executed trade information includes information on trades executed by the electronic exchange based on the orders;
correlate using at least one processor, the executed trade information and broker order data;
generate, based upon the correlated data and using at least one processor, a view arranged to simultaneously display order spread, trade price for executed trades, and order book depth over a time period; and
output the generated view.

20. The non-transitory tangible storage medium according to claim 19, wherein the operations further comprise displaying a first graph representing the order spread and the trade price for executed trades and a second graph representing the order book depth.

* * * * *